United States Patent
Han et al.

(10) Patent No.: US 11,394,844 B2
(45) Date of Patent: Jul. 19, 2022

(54) AUTHENTICATION SYSTEM, SHARED TERMINAL, AND AUTHENTICATION METHOD

(71) Applicants: Xiaofeng Han, Kanagawa (JP); Keiichiro Hitomi, Kanagawa (JP); Shikou Miyamoto, Kanagawa (JP)

(72) Inventors: Xiaofeng Han, Kanagawa (JP); Keiichiro Hitomi, Kanagawa (JP); Shikou Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 51 days.

(21) Appl. No.: 17/034,616

(22) Filed: Sep. 28, 2020

(65) Prior Publication Data

US 2021/0099599 A1 Apr. 1, 2021

(30) Foreign Application Priority Data

Sep. 30, 2019 (JP) .............................. JP2019-180104
Nov. 8, 2019 (JP) .............................. JP2019-203339

(51) Int. Cl.
*H04N 1/00* (2006.01)
*H04N 1/44* (2006.01)

(52) U.S. Cl.
CPC ..... *H04N 1/00854* (2013.01); *H04N 1/00411* (2013.01); *H04N 1/4433* (2013.01)

(58) Field of Classification Search
None
See application file for complete search history.

(56) References Cited

U.S. PATENT DOCUMENTS

| 8,549,598 | B2 * | 10/2013 | Tsujimoto | H04N 1/00344 726/7 |
| 8,903,704 | B2 | 12/2014 | Han et al. | |
| 8,949,599 | B2 * | 2/2015 | Nakajima | H04L 9/3263 713/156 |
| 9,003,388 | B2 | 4/2015 | Han et al. | |

(Continued)

FOREIGN PATENT DOCUMENTS

| JP | 2016-212654 | 12/2016 |
| JP | 2017-084378 | 5/2017 |
| JP | 2018-046551 | 3/2018 |

*Primary Examiner* — Paul F Payer
(74) *Attorney, Agent, or Firm* — IPUSA, PLLC

(57) ABSTRACT

An authentication system includes a shared terminal; and at least one information processing apparatus coupled to the shared terminal via a communication network. The shared terminal includes an authentication controller configured to, upon detecting that the shared terminal is activated, acquire authentication screen data, from the at least one information processing apparatus, for authentication performed for using an internal function of the shared terminal, display an authentication screen based on the acquired authentication screen data, and transmit, to the at least one information processing apparatus, input information that is input to the displayed authentication screen by a user; and an internal function operator configured to display a screen for using the internal function of the shared terminal, upon acquiring information indicating that an authentication process, which is performed based on the input information at the at least one information processing apparatus, is successful.

13 Claims, 30 Drawing Sheets

(56) References Cited

U.S. PATENT DOCUMENTS

| | | |
|---|---|---|
| 9,454,388 B2 | 9/2016 | Han et al. |
| 9,762,766 B2 | 9/2017 | Han |
| 9,813,570 B2 | 11/2017 | Han |
| 9,886,222 B2 * | 2/2018 | Sato ................. G06F 3/1278 |
| 9,992,235 B2 | 6/2018 | Satoh et al. |
| 10,033,898 B2 | 7/2018 | Han |
| 10,262,117 B2 | 4/2019 | Han |
| 10,310,786 B2 | 6/2019 | Miyamoto |
| 10,382,640 B2 | 8/2019 | Han |
| 10,534,568 B2 | 1/2020 | Han |
| 10,546,017 B2 | 1/2020 | Hitomi et al. |
| 10,581,854 B2 | 3/2020 | Han |
| 10,630,857 B2 | 4/2020 | Han |
| 2013/0219261 A1 | 8/2013 | Han et al. |
| 2014/0281914 A1 | 9/2014 | Sakawaki et al. |
| 2015/0309996 A1 | 10/2015 | Han |
| 2017/0255992 A1 | 9/2017 | Han |
| 2018/0068345 A1 | 3/2018 | Hirokawa et al. |
| 2019/0281178 A1 | 9/2019 | Han |
| 2019/0373130 A1 | 12/2019 | Han |

* cited by examiner

☷ TENANT INFORMATION

| BASIC INFORMATION |
| DEVICE LOGIN INFORMATION |
| CONTRACT INFORMATION |
| THEME SETTING |

BASIC INFORMATION

TENANT ID  304421365

TENANT NAME  XYZ

TENANT SEGMENT  ○○

COUNTRY/AREA  GERMANY

TIME ZONE  (UTC+1:00) AMSTERDAM, BERLIN, BERN, VIENNA

RETURN MAIL LANGUAGE  [JAPANESE ∨]

[SAVE]

FIG.6

DEVICE MANAGEMENT

LIST OF REGISTERED DEVICES

CORRESPONDING NUMBER OF CASES: 5

[DELETE] [EDIT COMMENT]

| | DEVICE IDENTIFICATION NUMBER | COMMENT |
|---|---|---|
| ☑ | 3F86-610055 | AAA··· |
| ☐ | 4985-965112 | AAA··· |
| ☐ | SDRAGC4C18F | BBB··· |
| ☐ | SD44-1Z0011 | BBB··· |
| ☐ | 3F41-770912 | BBB··· |

NUMBER OF CASES  20    1/1

FIG.7

🗐 USER REGISTRATION

\* ARE ESSENTIAL ITEMS

BASIC SETTING

| | |
|---|---|
| MAIL ADDRESS REGISTRATION | ● YES ○ NO |
| USER ID | [ ] |
| MAIL ADDRESS | [ ] |
| SURNAME | [ ] |
| FIRST NAME | [ ] |
| DEVICE ACCOUNT COOPERATION/ACCOUNT ID | [ ] |
| RETURN MAIL LANGUAGE | JAPANESE ⌄ |

ROLE

○ SYSTEM ADMINISTRATOR ● GENERAL USER

[SAVE] [CANCEL]

USER MANAGEMENT

CORRESPONDING NUMBER OF USERS: 7

| CREATE | : | IMPORT | TRANSMIT MAIL FOR USER REGISTRATION | | NUMBER OF CASES | 20 | | SEARCH | SEARCH CLEAR |
|---|---|---|---|---|---|---|---|---|---|

| | ROLE | USER ID | MAIL ADDRESS | SURNAME | NAME | STATE |
|---|---|---|---|---|---|---|
| ☐ | ☼ | aaa | | aaa | ss | ENABLED |
| ☐ | ☼ | bbb | bbb@x.com | bbb | hh | ENABLED |
| ☐ | ጸ | hoge | | hoge | hoge | ENABLED |
| ☐ | ☼ | ccc | ccc@x.com | ccc | kk | ENABLED |
| ☐ | ጸ | ddd | ddd@x.com | ddd | pp | ENABLED |
| ☐ | ☼ | eee | eee@x.com | eee | tt | ENABLED |
| ☐ | ☼ | fff | | fff | tt | ENABLED |

▼ ▼ 1/1 ▲ ▲

NUMBER OF CASES 20

▼ ▼ 1/1 ▲ ▲ >

AUTHENTICATION SYSTEM, SHARED TERMINAL, AND AUTHENTICATION METHOD

CROSS-REFERENCE TO RELATED APPLICATION

The present application is based on and claims priority under 35 U.S.C. § 119 to Japanese Patent Application No. 2019-180104, filed on Sep. 30, 2019, and Japanese Patent Application No. 2019-203339, filed on Nov. 8, 2019, the contents of which are incorporated herein by reference in their entirety.

BACKGROUND OF THE INVENTION

1. Field of the Invention

The present invention relates to an authentication system, a shared terminal, and an authentication method.

2. Description of the Related Art

An authentication system has been developed in which the authentication function of a terminal shared by multiple users is implemented in an information processing apparatus other than the terminal, and the function of the terminal is used according to the authentication result.

Patent Document 1: Japanese Unexamined Patent Application Publication No. 2017-084378

SUMMARY OF THE INVENTION

According to one aspect of the present invention, there is provided an authentication system including a shared terminal; and at least one information processing apparatus coupled to the shared terminal via a communication network. The shared terminal includes an authentication controller configured to, upon detecting that the shared terminal is activated, acquire authentication screen data, from the at least one information processing apparatus, for authentication performed for using an internal function of the shared terminal, display an authentication screen based on the acquired authentication screen data, and transmit, to the at least one information processing apparatus, input information that is input to the displayed authentication screen by a user; and an internal function operator configured to display a screen for using the internal function of the shared terminal, upon acquiring information indicating that an authentication process, which is performed based on the input information at the at least one information processing apparatus, is successful.

BRIEF DESCRIPTION OF THE DRAWINGS

FIG. 5 is a diagram illustrating an example of a tenant management screen according to the first embodiment of the present invention;

FIG. 6 is a diagram illustrating an example of a device management screen according to the first embodiment of the present invention;

FIG. 7 is a diagram illustrating an example of a user registration screen according to the first embodiment of the present invention;

FIG. 8 is a diagram illustrating an example of a user management screen according to the first embodiment of the present invention;

DETAILED DESCRIPTION OF THE PREFERRED EMBODIMENTS

In a conventional authentication system, an authentication screen for using the authentication function of an information processing apparatus has been implemented in a terminal. However, when modifying the authentication function, such as when customizing or upgrading the authentication function, it has been necessary to update the authentication screen implemented on the terminal, on a per-terminal basis. Thus, as the number of terminals increases, it becomes more time-consuming to modify the authentication function. Therefore, there has been a problem that the load of system management operations is increased.

A problem to be addressed by an embodiment of the present invention is to reduce the load of system management operations.

First Embodiment

Figure 1:
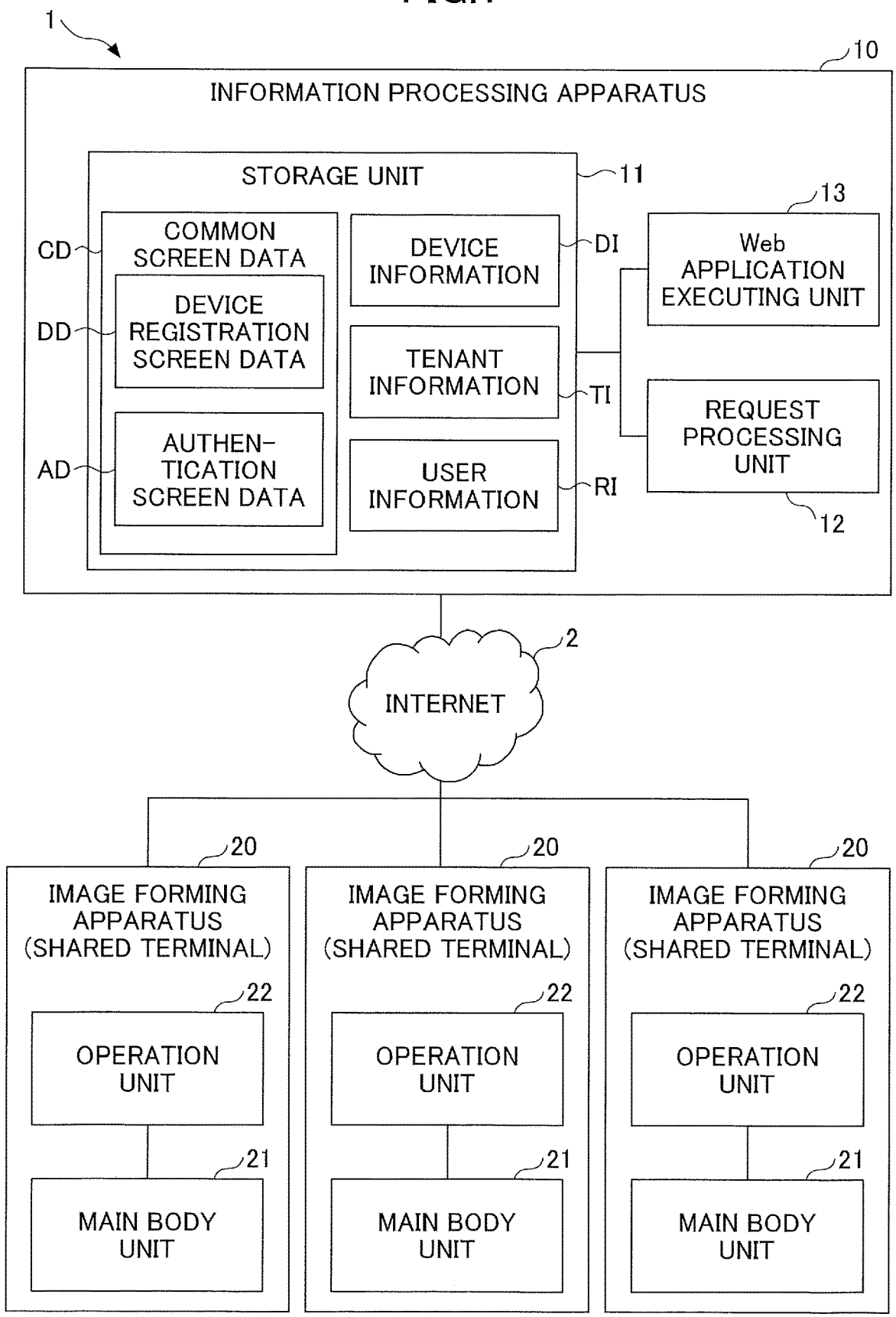
FIG. 1 is a diagram illustrating an example of a system configuration of an image forming system according to a first embodiment of the present invention.

Hereinafter, a first embodiment in which an authentication system according to an embodiment of the present invention is applied to an image forming system will be described with reference to the drawings. As illustrated in FIG. 1, an image forming system 1 according to the present embodiment includes an information processing apparatus 10 and an image forming apparatus 20.

The information processing apparatus 10 is connected to each of the one or more image forming apparatuses 20 in a communicable manner through the Internet 2. The information processing apparatus 10 functions as a web server that provides various functions including external functions such as authentication, tenant information management, device information management, user information management, screen information management, file management, and other cooperation functions to the image forming apparatus 20. The information processing apparatus 10 may be an information processing system configured by a plurality of information processing apparatuses. In this case, various functions of the information processing apparatus 10 may be included in another information processing apparatus to implement the system.

The image forming apparatus 20 is an apparatus for implementing an image forming function such as scanning, printing, and copying. The image forming apparatus 20 not only implements the image forming function alone, but also functions as a web client that utilizes various functions provided from the information processing apparatus 10.

The Internet 2 is an example of a communication network and may be used for wireless communication or wired communication, and may be a local area network (LAN), a wide area network (WAN), a virtual private network (VPN), and the like.

The image forming apparatus 20 can form, for example, an image from a file stored in various cloud servers connected via the Internet 2, by having the information processing apparatus 10 execute a web application program (hereinafter, referred to as a web application). The web application is an application program defining a function that is provided to the image forming apparatus 20 that is the web client, by the information processing apparatus 10 that is the web server.

The image forming apparatus 20 has a main body authentication function for authenticating a user who uses the image forming function such as scanning, printing, and copying. That is, the main body authentication is the authentication (first authentication) for using the internal functions of the image forming apparatus 20. The authentication information input by a user for authentication at the image forming apparatus 20 (shared terminal) includes user information such as an ID or password input by manual input on the operation panel of the apparatus, ID information input by contact of an integrated circuit (IC) card with an IC card reader of the apparatus, and image/biometric information obtained by image authentication or biometric authentication of the apparatus. When the authentication information is compared with the user information registered in the apparatus or outside the apparatus and the association is confirmed, the authentication is successful (the user is authenticated). By accepting input of authentication information of any of the authentication methods in a state where an authentication screen is displayed, an authentication process can be requested and started inside or outside the apparatus.

In the image forming apparatus 20, the main body authentication setting can be set to be either enabled (ON) or disabled (OFF). The main body authentication setting indicates whether the main body authentication function is to be used.

When the main body authentication setting is ON, the main body authentication is executed, and when the main body authentication is successful, an image forming unit 29 (see FIG. 4) can execute the image forming process. When the main body authentication setting is OFF, the image forming unit 29 can execute the image forming process without executing the main body authentication.

When the main body authentication setting is ON, either standard authentication or system authentication is set. The standard authentication is an authentication method for authenticating by the image forming apparatus 20 alone. The system authentication is an authentication method for using, from the image forming apparatus 20 (the shared terminal) via the network, an authentication function provided outside the image forming apparatus 20 (the shared terminal). Examples of an authentication function provided outside the image forming apparatus (the shared terminal) are an authentication function provided by an authentication server as the authentication base used from internal and external functions of the information processing apparatus 10 (or an information processing system), and an authentication service provided by an external web service such as the groupware.

Regardless of the main body authentication setting, the web application can determine whether the web application can be used by each user or each device, by using the authentication function of the information processing apparatus 10 or the information processing system, for individual cases as needed. The authentication function implemented in a web application is hereinafter referred to as web application authentication. Web application authentication is authentication (second authentication) for using the external functions of the information processing apparatus 10 or the information processing system.

In the image forming system 1 according to the present embodiment, authentication screen data (first authentication screen data) for use in the system authentication is commonly used by a plurality of the image forming apparatuses 20. Also, the information processing apparatus 10 commonly uses the above-described authentication screen data (first authentication screen data), as screen data (second authentication screen data) of the web application authentication called from each image forming apparatus 20.

Specifically, the information processing apparatus 10 includes a storage unit 11, a request processing unit 12, and a web application executing unit 13.

The storage unit 11 stores various kinds of information such as common screen data CD, device information DI, tenant information TI, and user information RI.

The common screen data CD is screen data commonly used by various devices such as the image forming apparatus 20. The screen data is commonly available for use from web applications external to the device or from multiple applications within the device, and can be provided so as to be displayed in response to requests from these various devices and various applications of various devices. Specifically, the common screen data CD includes device registration screen data DD and authentication screen data AD. The device registration screen data DD includes device registration input screen data and device registration completion screen data. Further, the common screen data CD may include screen data representing a setting screen of various devices or a screen to be displayed by an application, for example, a screen for executing image formation. The common screen data CD is the same screen data that is called by various functions to be described later.

Various types of information such as device information DI, tenant information TI, user information RI, etc., are necessary information for main body authentication or web application authentication.

The request processing unit 12 transmits the common screen data CD to the image forming apparatus 20 based on a request signal transmitted from the image forming apparatus 20.

The web application executing unit 13 executes a process defined in various web applications for implementing external functions provided to the image forming apparatus 20. When the process defined in the web application is a process content that requires authentication, the web application executing unit 13 executes web application authentication and executes a process when authentication is successful.

The image forming apparatus 20 includes a main body unit 21 and an operation unit 22.

The main body unit 21 implements an image forming function such as copying, scanning, and printing, that is, an internal function of the image forming apparatus 20.

The operation unit 22 instructs the main body unit 21 to execute various processes in response to a user's operation. The operation unit 22 includes an interface for selecting and operating an application program to be activated. Application programs include a native application and a browser application.

The native application is an application program defining a process to be executed by the image forming apparatus 20 alone. The native application is executed when the main body authentication described above is successful. An authentication application for performing the main body authentication and the like may also be implemented in the native application.

The browser application is an application program that implements web browser functions. The browser application (the web browser application) displays the execution result, obtained by the information processing apparatus 10 by executing a process defined in the web application, and implements a function of transmitting an operation content to the information processing apparatus 10 upon accepting a user's operation.

Next, the hardware configuration of each apparatus provided in the image forming system 1 according to the present embodiment will be described.

Figure 2:
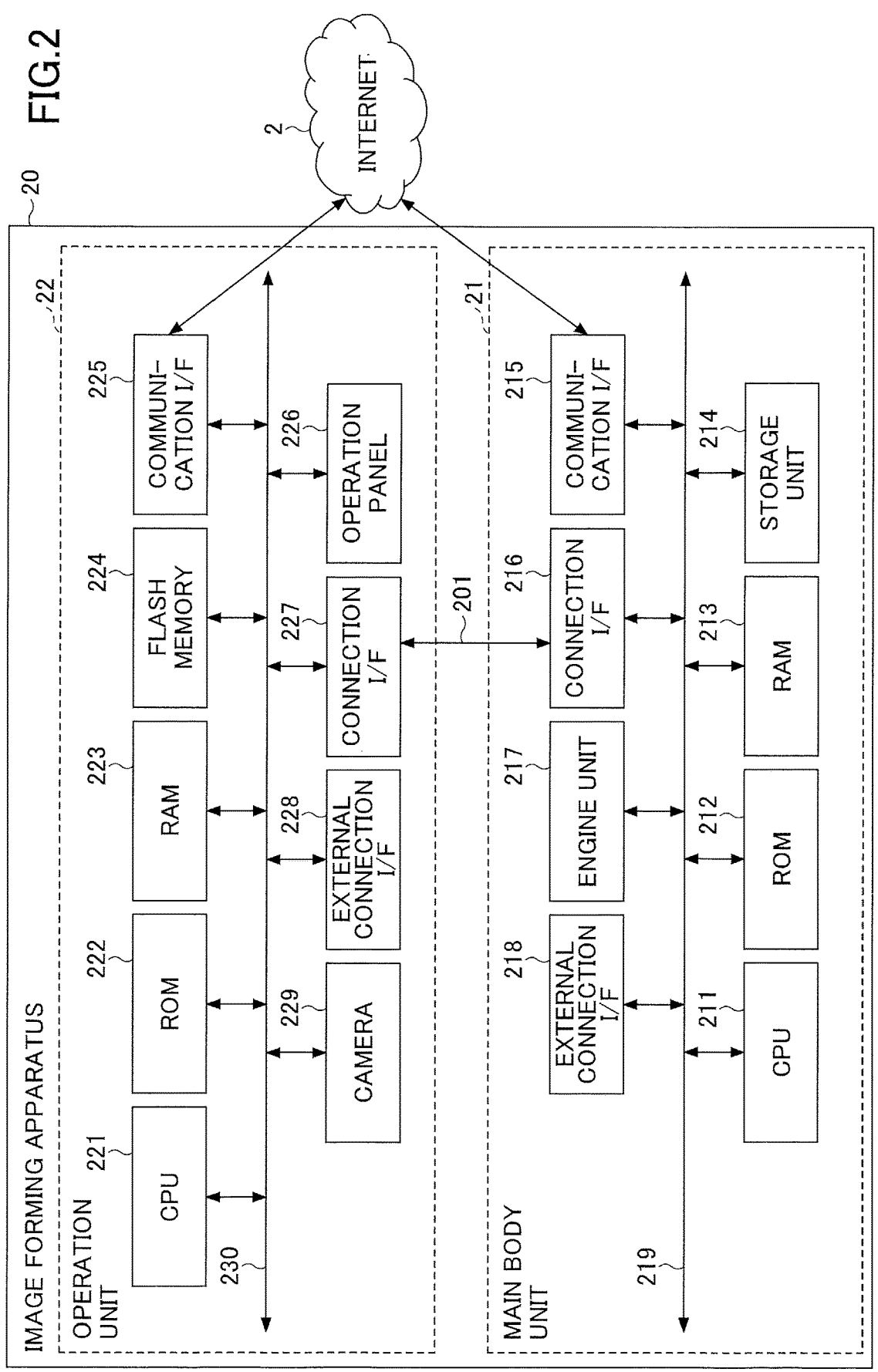
FIG. 2 is a diagram illustrating an example of a hardware configuration of an image forming apparatus according to the first embodiment of the present invention.

As illustrated in FIG. 2, the image forming apparatus 20 includes the main body unit 21 for implementing an internal function and the operation unit 22 for accepting an operation by a user. The concept of accepting a user's operation includes accepting information (including a signal indicating a coordinate value of a screen) input in accordance with a user's operation.

The main body unit 21 and the operation unit 22 are connected to each other by a communication path 201 in a communicable manner. The communication path 201 may be of the Universal Serial Bus (USB) standard, for example. The communication path 201 may be of a standard other than the USB standard, whether wired or wireless.

The main body unit 21 includes a Central Processing Unit (CPU) 211, a Read-Only Memory (ROM) 212, a Random Access Memory (RAM) 213, a storage unit 214, a communication interface (I/F) 215, a connection I/F 216, an engine unit 217, an external connection I/F 218, and a system bus 219.

The CPU 211 is an arithmetic device that executes a program stored in the ROM 212 or the storage unit 214, using the RAM 213 as the work area (work area) to control the operation of the entire main body unit 21. For example, the CPU 211 implements various functions such as copying, scanning, fax communication, and printing by using the engine unit 217.

The ROM 212 is, for example, a non-volatile memory that stores a Basic Input/Output System (BIOS) executed when the main body unit 21 is activated, various settings, etc. The RAM 213 is a volatile memory used as a work area and the like of CPU 211. The storage unit 214 is a non-volatile storage device for storing, for example, an operating system (OS), an application program, and various kinds of data. For example, the storage unit 214 is configured by a hard disk drive (HDD), a solid state drive (SSD), and the like.

The communication I/F 215 is a network interface, such as a wireless LAN or a wired LAN, for connecting the main body unit 21 to the Internet 2 and communicating with an external apparatus. The connection I/F 216 is an interface for performing communication between the main body unit 21 and the operation unit 22 via the communication path 201.

The engine unit 217 is hardware that performs general-purpose information processing and non-communication processing for implementing functions such as copying, scanning, fax communication, and printing. The engine unit 217 includes, for example, a scanner (image reading unit) for scanning and reading an image of a document, a plotter (image forming unit) for printing an image onto a sheet material such as paper, a fax unit for performing fax communication, and the like. Further, the engine unit 217 may include specific options such as a finisher for sorting the printed sheet materials or an automatic document feeder (ADF) for automatically feeding a document.

The external connection I/F 218 is an interface for connecting an external device to the main body unit 21. External devices may include, for example, an IC card reader, a mobile sensor, and the like. The system bus 219 is connected to the elements described above and transmits address signals, data signals, various control signals, and the like.

The operation unit 22 includes a CPU 221, a ROM 222, a RAM 223, a flash memory 224, a communication I/F 225, an operation panel 226, a connection I/F 227, an external connection I/F 228, a camera 229, and a system bus 230.

The CPU 221 is an arithmetic device that executes a program stored in the ROM 222 or the flash memory 224, using the RAM 223 as the work area (work area), to control the operation of the entire operation unit 22. The ROM 222, for example, is a non-volatile memory that stores the BIOS executed at the time of activation of the operation unit 22 and various settings. The RAM 223 is a volatile memory used as a work area of CPU 221 and the like. The flash memory 224 is a non-volatile storage device for storing, for example, an operating system (OS), an application program, and various kinds of data.

The communication I/F 225 is a network interface, such as a wireless LAN or a wired LAN, for connecting the operation unit 22 to the Internet 2 and communicating with an external device.

The operation panel 226 accepts various inputs according to the operation of a user and displays various kinds of information. The operation panel 226 may be, for example, a Liquid Crystal Display (LCD) equipped with a touch panel function, but is not limited thereto. For example, the operation panel 226 may be configured by an organic Electro Luminescence (EL) display device having a touch panel function. Further, the operation panel 226 may additionally or alternatively include an operation unit, such as a hardware key, or a display unit, such as a lamp.

The connection I/F 227 is an interface for performing communication between the operation unit 22 and the main body unit 21 through the communication path 201. The external connection I/F 228 is an interface, e.g., a Universal Serial Bus (USB), for connecting external devices.

The camera 229 is a photographing apparatus for capturing an image of a user. The camera 229 may be disposed outside of the image forming apparatus 20 and connected to the operation unit 22 through the external connection I/F 228. The system bus 230 is connected to the elements described above and transmits address signals, data signals, various control signals, and the like.

Figure 3:
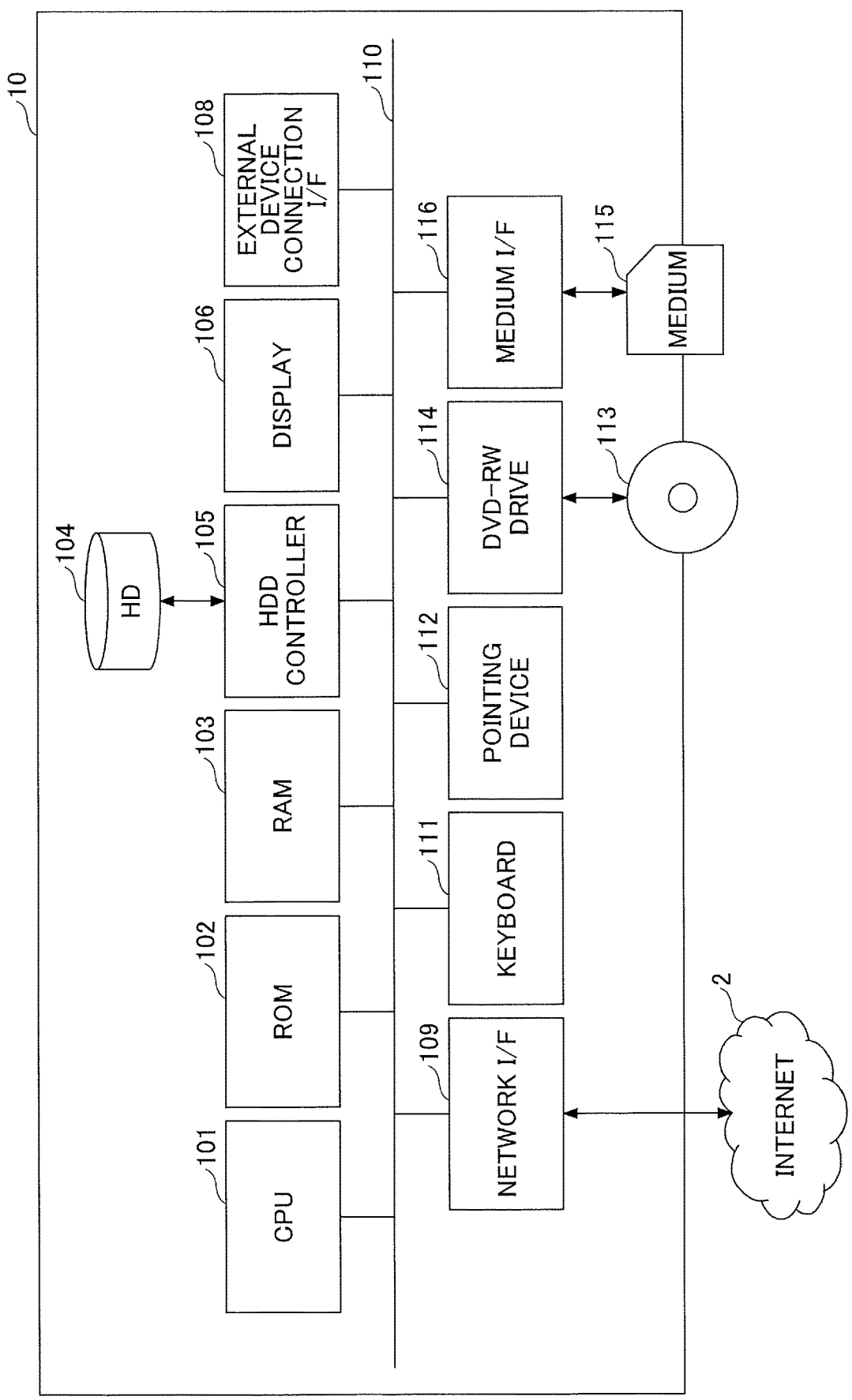
FIG. 3 is a diagram illustrating an example of a hardware configuration of an information processing apparatus according to the first embodiment of the present invention.

As illustrated in FIG. 3, the information processing apparatus 10 is configured by a computer and includes a CPU 101, a ROM 102, a RAM 103, an HD 104, a hard disk drive (HDD) controller 105, a display 106, an external device connection I/F 108, a network I/F 109, a bus line 110, a keyboard 111, a pointing device 112, a Digital Versatile Disk Rewritable (DVD-RW) drive 114, and a medium I/F 116.

Among these elements, the CPU 101 controls the operation of the entire information processing apparatus 10. The ROM 102 stores a program used to drive the CPU 101, such as an Initial Program Loader (IPL). The RAM 103 is used as a work area of CPU 101. The HD 104 stores programs such as guest network creation applications and various kinds of other data. The HDD controller 105 controls the reading or writing of various kinds of data with respect to the HD 104 according to the control of the CPU 101. The display 106 displays various kinds of information such as a cursor, a menu, windows, characters, or images.

The external device connection I/F 108 is an interface for connecting various external devices. In this case, the external device is, for example, a USB memory, a printer, and the like. The network I/F 109 is an interface for performing data communication with the image forming apparatus 20 and the like using the Internet 2. The bus line 110 is an address bus, a data bus, etc., for electrically connecting elements such as the CPU 101 illustrated in FIG. 3.

The keyboard 111 is a type of input means having a plurality of keys for inputting characters, numerical values, various instructions, and the like. The pointing device 112 is a type of input means for selecting and executing various instructions, selecting a processing target, moving a cursor, and the like. The DVD-RW drive 114 controls the reading or writing of various kinds of data with respect to a DVD-RW 113 as an example of a removable recording medium. The recording medium may not only be a DVD-RW but also a Digital Versatile Disc Recordable (DVD-R), etc. The medium I/F 116 controls the reading or writing (storage) of data to with respect to a medium 115, such as flash memory.

Figure 4:
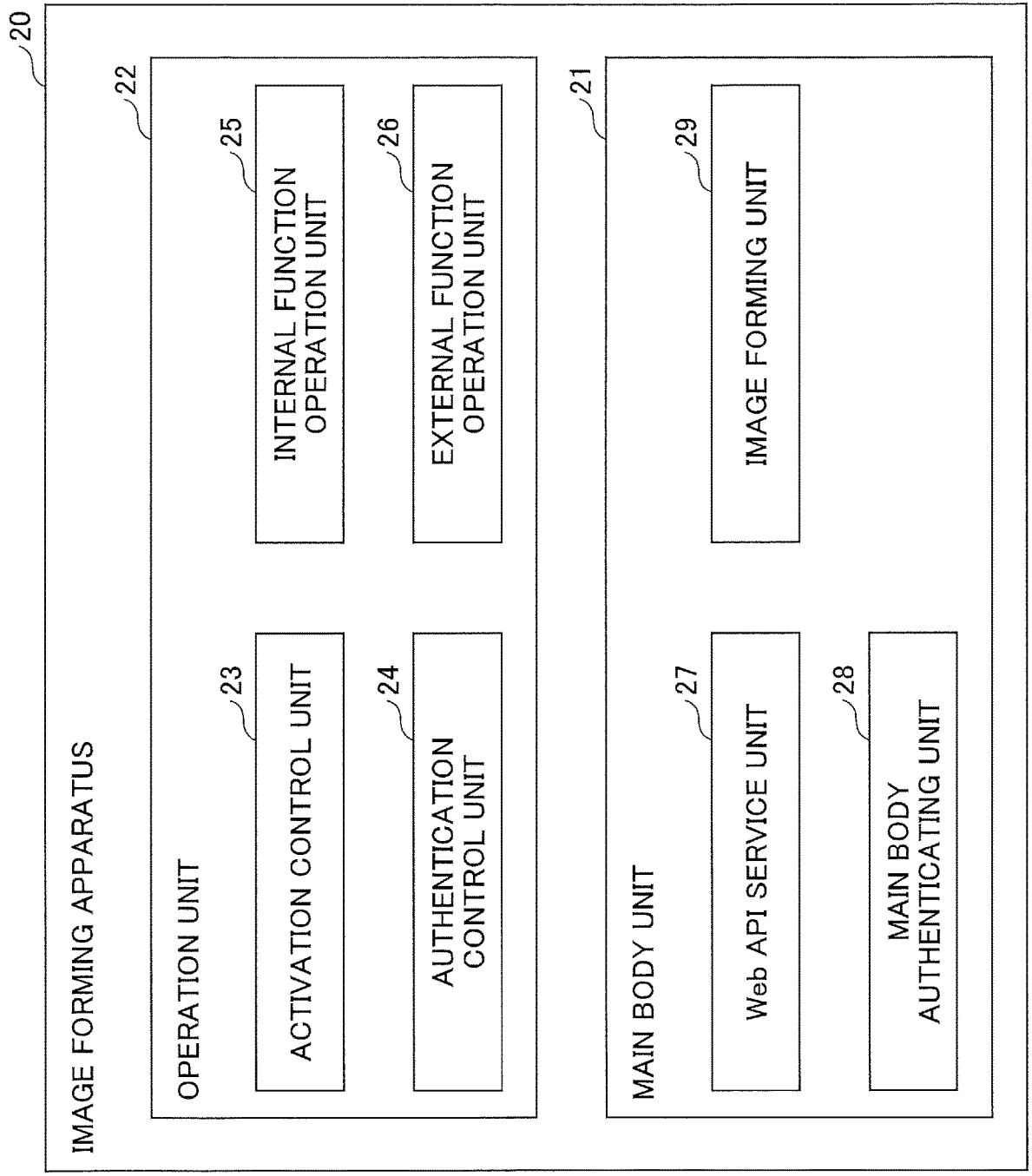
FIG. 4 is a diagram illustrating an example of functions of the image forming apparatus according to the first embodiment of the present invention.

Next, functions provided in the image forming apparatus 20 will be described with reference to FIG. 4.

The image forming apparatus 20 according to the present embodiment includes the main body unit 21 21 and the operation unit 22.

The operation unit 22 includes an activation control unit 23, an authentication control unit 24, an internal function operation unit 25, and an external function operation unit 26.

The activation control unit 23 executes a process when the power switch of the image forming apparatus 20 is turned ON and the image forming apparatus 20 is activated. Further, the activation control unit 23 executes a process when the operation unit 22 returns to a standard mode after being switched from the standard mode to an energy saving mode due to not being operated for a certain period of time.

The energy saving mode is a state of consuming less power than in the standard mode. The operation unit 22 switches from the standard mode to the energy saving mode, when the time of not being operated exceeds a predetermined time, or by an operation by a user. The operation unit 22 returns to the standard mode from the energy saving mode by an operation of a user and the like.

When a main body authentication setting is ON and system authentication is set, the authentication control unit 24 uses the authentication function of the information processing apparatus 10 for the main body authentication. Specifically, the authentication control unit 24 requests the information processing apparatus 10 to transmit the common screen data CD, such as the device registration screen data DD and the authentication screen data AD. The authentication control unit 24 may be implemented as an authentication application that operates on the operation unit 22 of the image forming apparatus 20.

The authentication control unit 24 has a web browser function and includes a function of displaying a screen and a function of accepting an operation from a user. The authentication control unit 24 displays a screen based on the common screen data CD received from the information processing apparatus 10 and executes a device registration process, an authentication process, and the like in response to an operation by a user. Upon successful authentication, the authentication control unit 24 reports the successful authentication to a main body authenticating unit 28 of the main body unit 21.

When the main body authentication setting is ON and the standard authentication is set, the authentication control unit 24 displays the authentication screen for the main body authentication and causes the main body authenticating unit 28 to execute the authentication process according to an operation by a user. In this case, the authentication control unit 24 does not communicate with the information processing apparatus 10.

The internal function operation unit 25 implements an internal function by reading the native application. The native application is an application program for implementing an internal function of the image forming apparatus 20. The internal function is a function included in the image forming apparatus 20, such as a print function, a scan function, and a copy function.

Specifically, when the main body authentication setting is ON, and the main body authentication is successful, the operation unit 22 displays a home screen for selecting a native application. When an operation for selecting a native application is accepted at the displayed home screen, the internal function operation unit 25 reads the selected native application and implements the internal function.

The external function operation unit 26 implements an external function by reading a browser application. The browser application has a web browser function. The browser application is displayed together with the native application on the home screen. When an operation for selecting a browser application is accepted at the displayed home screen, the external function operation unit 26 reads the selected browser application and implements the external function.

Specifically, the external function operation unit 26 transmits a Hypertext Transfer Protocol (HTTP) request to the information processing apparatus 10 and displays a screen defined by Hypertext Markup Language (HTML) data included in the HTTP response that is returned based on the result of processing of the external function in the information processing apparatus 10.

The external function operation unit 26 repeatedly executes the process of transmitting the HTTP request to the information processing apparatus 10 and displaying the screen defined by the HTML data included in the returned HTTP response, every time a user's operation is accepted at the displayed screen.

The main body unit 21 includes a web Application Programming Interface (API) service unit 27, the main body authenticating unit 28, and an image forming unit 29.

The web API service unit 27 provides a web API to the operation unit 22. The web API is an interface for utilizing various functions of the main body unit 21. The web API includes an API that acquires a device identification number. The web API service unit 27 transmits the device identification number stored in the main body unit 21 to the operation unit 22 in response to an API call from the operation unit 22. The device identification number is a number for identifying the image forming apparatus 20.

The main body authenticating unit 28 executes the main body authentication. Specifically, when the main body authentication setting is ON and the standard authentication is set, the main body authenticating unit 28 executes the main body authentication process upon receiving a request from the authentication control unit 24, and determines whether authentication is successful.

In a case where the main body authentication setting is ON and the system authentication is set, when the main body authenticating unit 28 receives a report of authentication successful from the authentication control unit 24, the main body authenticating unit 28 determines that the main body authentication is successful and approves of the execution of the internal function.

The image forming unit 29 executes an image forming process such as copying, scanning, fax communication, and printing. When the main body authentication setting is ON, the image forming unit 29 executes an image forming process on the condition that the authentication by the main body authenticating unit 28 is successful.

Next, an operation of the image forming system 1 will be described with reference to the drawings.

As a prerequisite, the tenant information TI, the user information RI, and the like are stored in the storage unit 11 of the information processing apparatus 10.

The tenant information TI is information of a tenant that is registered, updated, or deleted by a system administrator, etc., via a tenant management screen 301 illustrated in FIG. 5. A tenant is a group to which a user belongs, such as a company, an organization, etc. Specifically, the tenant information TI includes, as items, for example, a tenant ID, which is a value representing an identifier identifying the tenant, and a tenant name, which is a value representing the name of the tenant.

The device information DI is information of a device that is registered by a device registration process as described below. A device according to the present embodiment is a shared terminal shared by a plurality of users, such as the image forming apparatus 20. The device information DI is managed by a system administrator and the like through a device management screen 302 illustrated in FIG. 6. Specifically, the device information DI is information including, as an item, for example, a device identification number, etc., which is a value representing an identifier that identifies the device.

The user information RI is information of a user that is registered, updated, or deleted by a system administrator and the like through a user registration screen 303 illustrated in FIG. 7, a user management screen 304 illustrated in FIG. 8, and the like. Specifically, the user information RI is information that includes, as items, for example, a user ID that is a value representing an identifier that identifies the user, a mail address that is a value representing a character string of the mail address, and a password that is a value representing a character string of the password. The tenant information TI, the device information DI, and the user information RI may be stored in association with each other. Accordingly, the information processing apparatus 10 can collect and manage the number of devices or users registered to the tenant, the usage status, the device state, and the like.

Next, a sequence of the device registration process will be described with reference to FIG. 9.

The device registration process is an initial setting process for registering the image forming apparatus 20 as a cooperation partner of the information processing apparatus 10. Through the device registration process, the device information DI described above is registered in the information processing apparatus 10. As a prerequisite, it is assumed that the main body authentication setting of the image forming apparatus 20 is ON and the system authentication is set.

In step S101, when the power of the image forming apparatus 20 is turned on, or when the mode returns from the energy saving mode to the standard mode, the activation control unit 23 transmits an activation request signal to the authentication control unit 24. The activation request signal is a signal requesting the activation of the authentication control unit 24.

In step S102, the authentication control unit 24 is activated upon receiving the activation request signal and transmits a device identification number request signal to the web API service unit 27 of the main body unit 21. The device identification number request signal is a signal requesting the transmission of data representing the device identification number. Hereinafter, data representing the device identification number is referred to as device identification number data.

Next, in step S103, the web API service unit 27 acquires device identification number data stored in the main body unit 21 and transmits the acquired device identification number data to the authentication control unit 24.

Next, step S104, the authentication control unit 24 transmits a device information request signal to the information processing apparatus 10. The device information request signal is a signal requesting the transmission of the device information DI.

In step S105, upon receiving the device information request signal, the request processing unit 12 of the information processing apparatus 10 confirms whether the device information DI is registered in the storage unit 11, and when not registered, the request processing unit 12 transmits an unsuccessful signal to the image forming apparatus 20. The unsuccessful signal indicates that the device information DI cannot be transmitted.

Once the device registration process is completed for each image forming apparatus 20, in step S105, with respect to the image forming apparatus 20 for which the device registration process is completed, the device information DI is transmitted. The process in this case will be described in the sequence of the main body authentication process that will be described later.

In step S106, upon receiving the unsuccessful signal, the authentication control unit 24 transmits a device registration request signal together with the device identification number data to the information processing apparatus 10. The device registration request signal is a signal requesting registration of the device information DI. The device identification number data that is transmitted is the device identification number data received in step S103.

In step S107, upon receiving the device registration request signal, the request processing unit 12 transmits a device registration input screen request signal to the storage unit 11. The device registration input screen request signal is a signal requesting the transmission of device registration input screen data.

The device registration input screen data is screen data included in the device registration screen data DD and represents a screen in which a selection field of an authentication method and an input field corresponding to an authentication method such as a tenant ID, a user ID, and a password, are arranged.

In step S108, the storage unit 11 transmits the device registration input screen data to the request processing unit 12. In step S109, the request processing unit 12 transmits the device registration input screen data to the authentication control unit 24.

Figure 10:
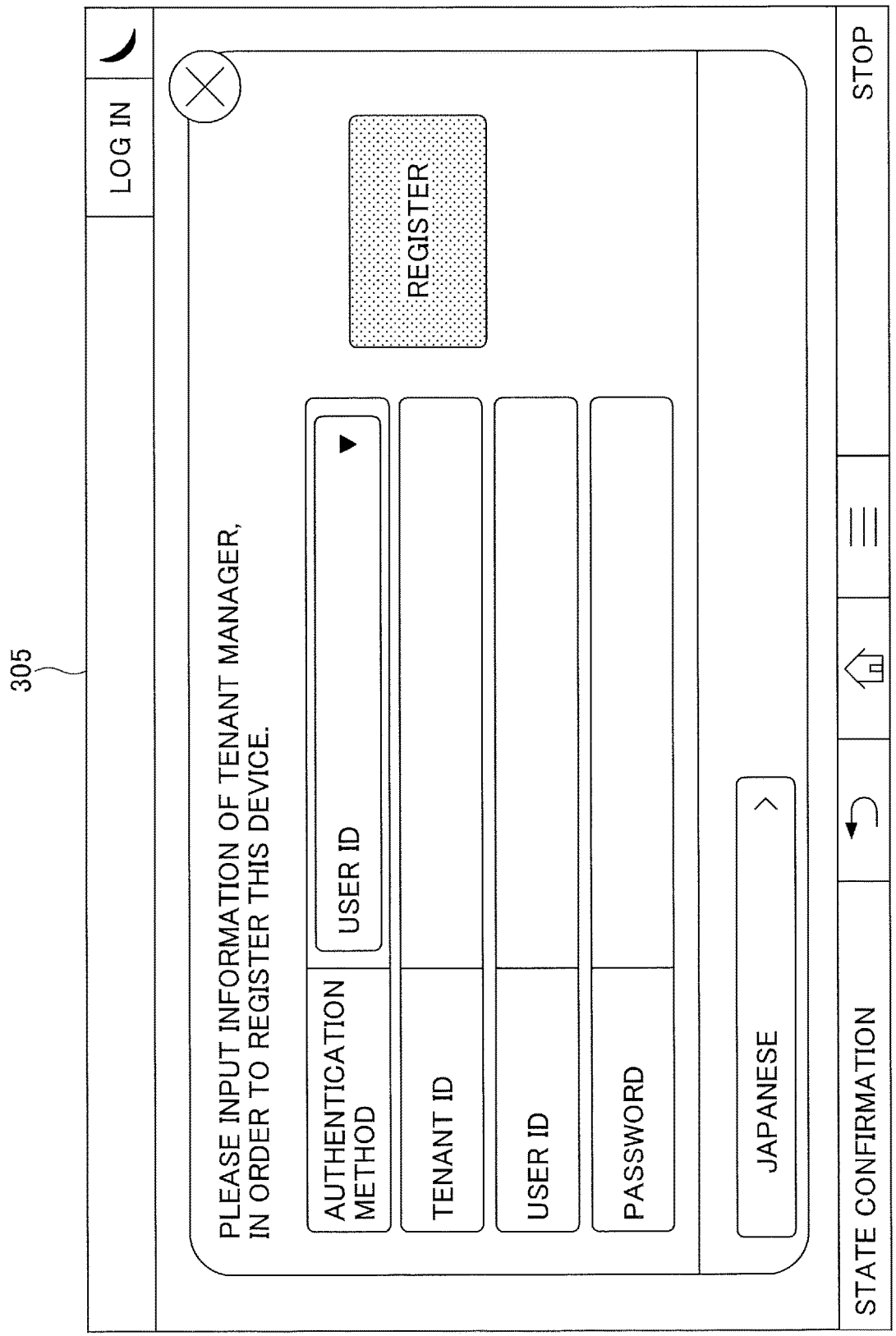
FIG. 10 is a diagram illustrating an example of a device registration screen according to the first embodiment of the present invention.

The authentication control unit 24 displays a device registration input screen 305 based on the device registration input screen data, by the web browser function, as illustrated in FIG. 10.

Returning to FIG. 9, in step S110, upon accepting an operation by a user, the authentication control unit 24 transmits input information to the information processing apparatus 10. The input information here is an authentication method, a tenant ID, a user ID, a password, etc.

In step S111, the request processing unit 12 executes the device registration process. Specifically, the request processing unit 12 confirms whether the tenant information TI and the user information RI corresponding to the tenant ID, the user ID, and the password included in the input information, are registered in the storage unit 11. When any item is not registered, the request processing unit 12 returns to the process in step S109 and prompts the user to re-input information.

When the tenant information TI and the user information RI corresponding to the tenant ID, the user ID, and the password included in the input information are registered in the storage unit 11, the request processing unit 12 stores the device identification number indicated by the device identification number data received in step S106 as the device information DI in the storage unit 11 in association with the tenant information TI and the user information RI.

Next, in step S112, the request processing unit 12 transmits a device registration completion screen request signal to the storage unit 11. In step S113, the storage unit 11 transmits device registration completion screen data to the request processing unit 12.

The device registration completion screen data is screen data included in the device registration screen data DD and represents a screen on which a message indicating that the device registration has been completed, is arranged.

Subsequently, in step S114, the request processing unit 12 transmits the device registration completion screen data to the image forming apparatus 20. The authentication control unit 24 of the image forming apparatus 20 displays a device registration completion screen, based on the received device registration completion screen data, by the web browser function.

Next, a sequence of the main body authentication process will be described with reference to FIG. 11.

As a prerequisite, it is assumed that the main body authentication setting of the image forming apparatus 20 is ON and the system authentication is set. Further, it is assumed that the aforementioned device registration process has already been executed.

In step S201, when the power of the image forming apparatus 20 is turned on, or when the mode returns from the energy saving mode to the standard mode, the activation control unit 23 transmits an activation request signal to the authentication control unit 24.

In step S202, the authentication control unit 24 is activated upon receiving the activation request signal and the authentication control unit 24 transmits a device identification number request signal to the web API service unit 27 of the main body unit 21.

Next, in step S203, the web API service unit 27 acquires device identification number data stored in the main body unit 21 and transmits the acquired device identification number data to the authentication control unit 24.

Next, in step S204, the authentication control unit 24 transmits a device information request signal to the information processing apparatus 10 (or an information processing apparatus having a device information management function in the information processing system).

In step S205, upon receiving the device information request signal, the request processing unit 12 of the information processing apparatus 10 confirms whether the device information DI is registered in the storage unit 11, and when the information is registered, the request processing unit 12 transmits the device information DI or tenant information corresponding to the device information DI, or an authentication ticket corresponding to the device, to the image forming apparatus 20. Here, the device information DI has already been registered because it is assumed that the device registration process has already been executed.

Next, in step S206, the authentication control unit 24 transmits an authentication request signal for displaying an authentication screen, to the information processing apparatus 10 (or an information processing apparatus that stores the common screen data in the information processing system). The authentication request signal is a signal requesting the start of the authentication process. The authentication request signal may include the device information DI, the tenant information TI, or the authentication ticket, acquired in step S205. The authentication request may be a method of executing an API requesting an authentication process or a method of executing an API requesting transmission of predetermined authentication screen data from the beginning.

In step S207, upon receiving the authentication request signal, the request processing unit 12 transmits an authentication screen request signal to the storage unit 11. The authentication screen request signal is a signal requesting the transmission of the authentication screen data AD.

The authentication screen data AD is data representing a screen in which a selection field for an authentication method and an input field corresponding to an authentication method such as a mail address and a password are arranged. The authentication screen data AD may be data representing an authentication screen of a different authentication method specified for each device or tenant, by using the device information DI, the tenant information TI, or the authentication ticket when requesting authentication.

In step S208, the storage unit 11 transmits the authentication screen data AD to the request processing unit 12. In step S209, the request processing unit 12 transmits the authentication screen data AD to the image forming apparatus 20.

Figure 12:
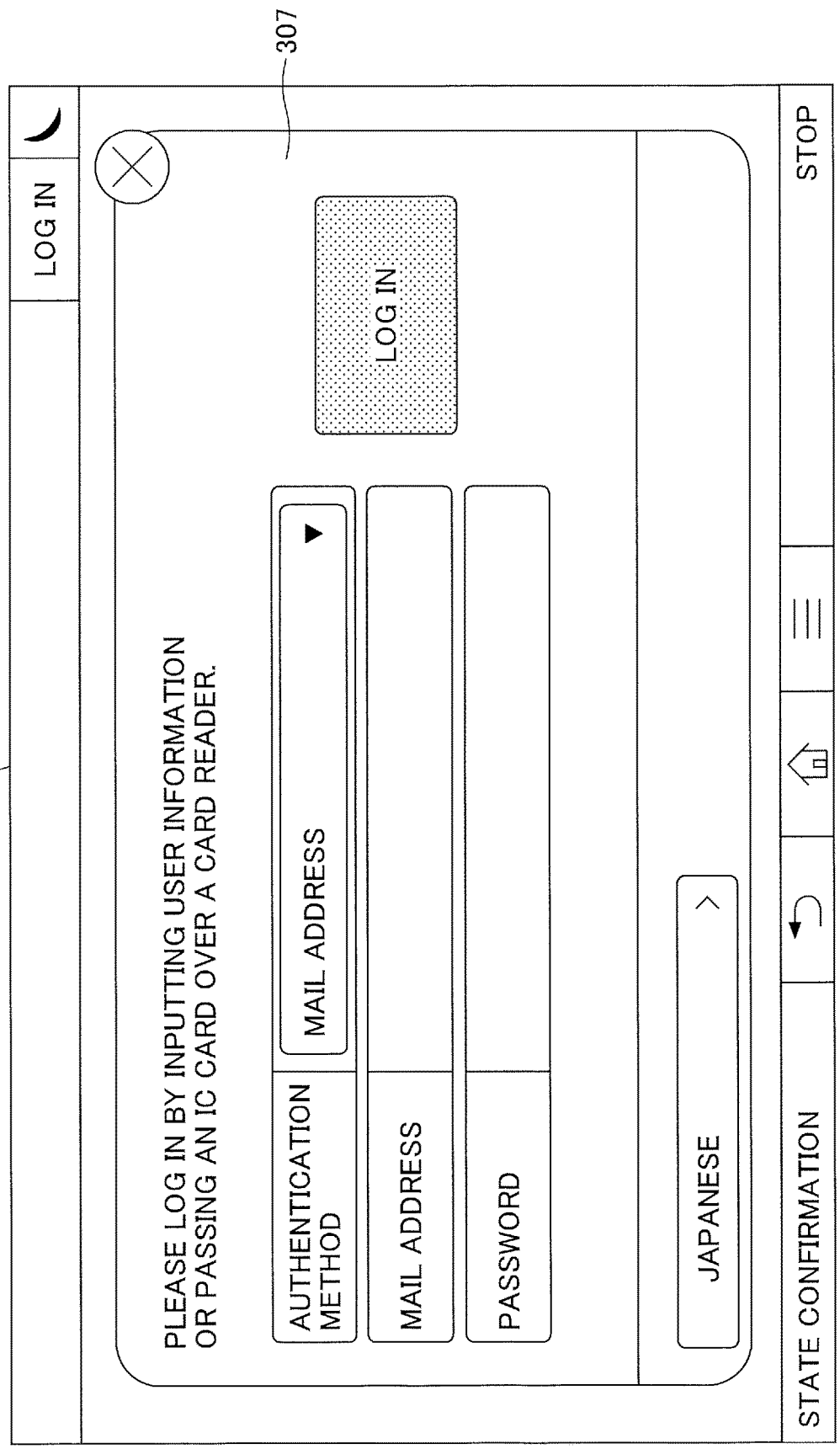
FIG. 12 is a diagram illustrating an example of an authentication screen according to the first embodiment of the present invention.

The authentication control unit 24 displays an authentication screen 306 based on the authentication screen data AD, by the web browser function, as illustrated in FIG. 12. This authentication screen 306 is displayed in a window 307 that is superimposed on the home screen. Accordingly, unless the window 307 is erased, an operation to the home screen, such as selecting an application icon or viewing a notification message, is not possible.

Returning to FIG. 11, in step S210, upon accepting the user's operation to the operation panel, the authentication control unit 24 transmits input information to the information processing apparatus (or an information processing apparatus that provides the authentication function in the information processing system). Here, the input information is the authentication method, a mail address, a password, etc. Even when the authentication information is input using an IC card or another authentication input method, the image forming apparatus 20 can transmit the authentication information to the information processing apparatus 10 through the browser function of the authentication control unit 24.

In step S211, the request processing unit 12 executes the authentication process based on the received input information. Specifically, the request processing unit 12 determines whether the input information matches the user information RI stored in the storage unit 11. When the request processing unit 12 determines that the input information matches the user information RI, the authentication is successful, and when the request processing unit 12 determines that the input information does not match the user information RI, the authentication is unsuccessful.

In the case of successful authentication, in step S212, the request processing unit 12 transmits an authentication successful signal. The authentication successful signal is a signal representing that authentication is successful and may be a token and the like, which is a character string encrypting the user ID.

When the authentication is unsuccessful, the request processing unit 12 may transmit a message representing authentication unsuccessful such as "authentication error" to the image forming apparatus 20 and prompt the user to re-input the information.

In step S213, the authentication control unit 24 of the image forming apparatus 20 transmits the received authentication successful signal to the main body authenticating unit 28. In step S214, upon receiving the authentication successful signal, the main body authenticating unit 28 executes the main body authentication process. Specifically, when the main body authenticating unit 28 receives the authentication successful signal, it becomes a state where the main body authentication is successful.

A state where the main body authentication is successful is the same as the state when authentication, which is executed when the main body authentication is ON and standard authentication is set, is successful. When it is a state where the main body authentication is successful, the image forming unit 29 of the main body unit 21 can execute various image forming processes.

In step S215, the main body authenticating unit 28 transmits a main body authentication successful signal to the authentication control unit 24. The main body authentication successful signal is a signal representing that the main body authentication is successful.

Next, in step S216, the authentication control unit 24 transmits a main body authentication completion report signal to the information processing apparatus 10. The main body authentication completion report signal is a signal for reporting that the main body authentication has been completed.

In step S217, upon receiving the main body authentication completion report signal, the request processing unit 12 of the information processing apparatus 10 transmits an authentication screen erase instruction signal to the image forming apparatus 20. The authentication screen erase instruction signal is a signal representing an instruction to erase the authentication screen.

Figure 13:
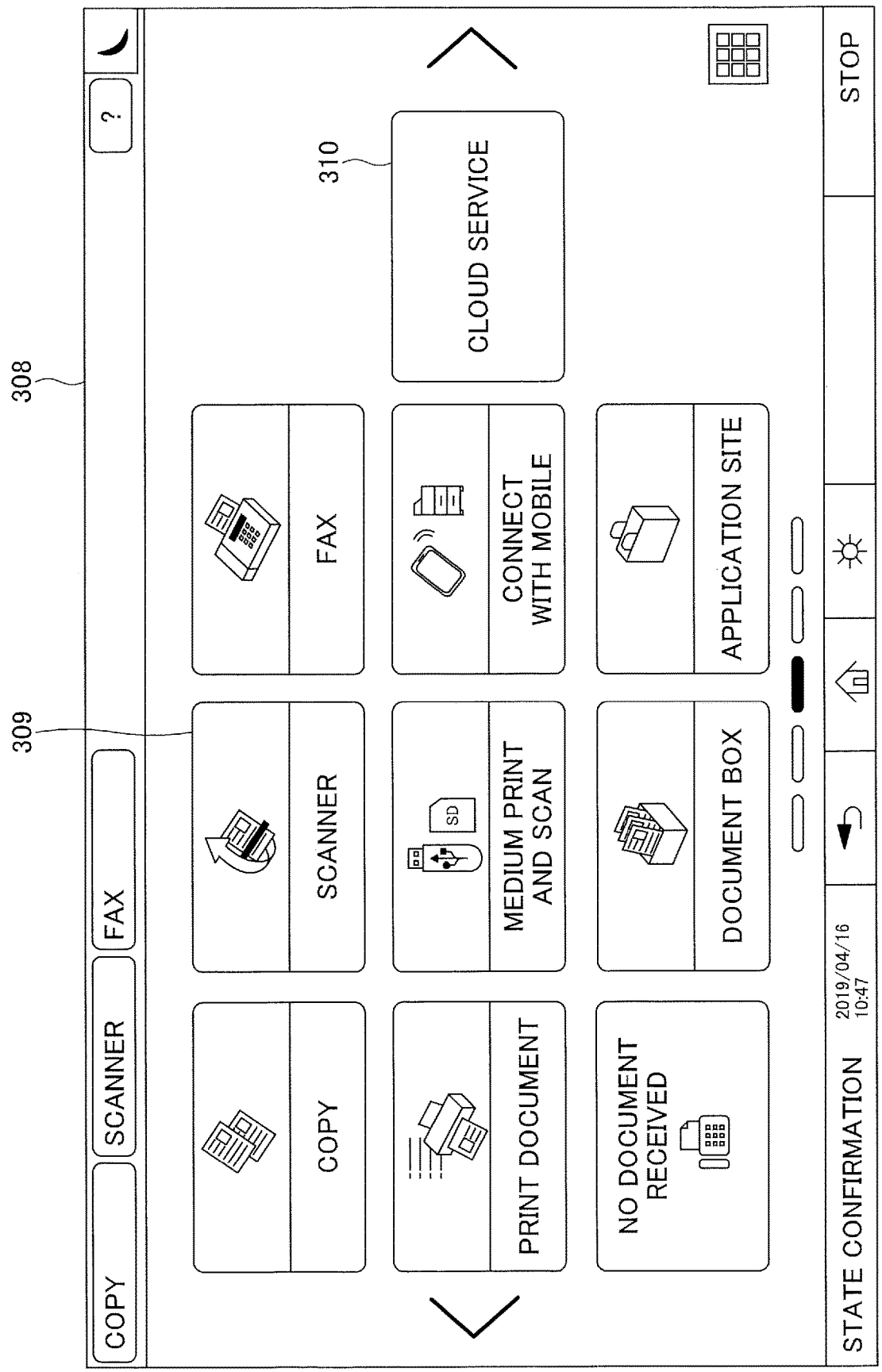
FIG. 13 is a diagram illustrating an example of a home screen according to the first embodiment of the present invention.

In step S218, upon receiving the authentication screen erase instruction signal, the authentication control unit 24 erases the authentication screen 306. Specifically, the authentication control unit 24 erases the window 307 superimposed on the home screen. Thus, a home screen 308 is displayed in an operable state as illustrated in FIG. 13.

Figure 14:
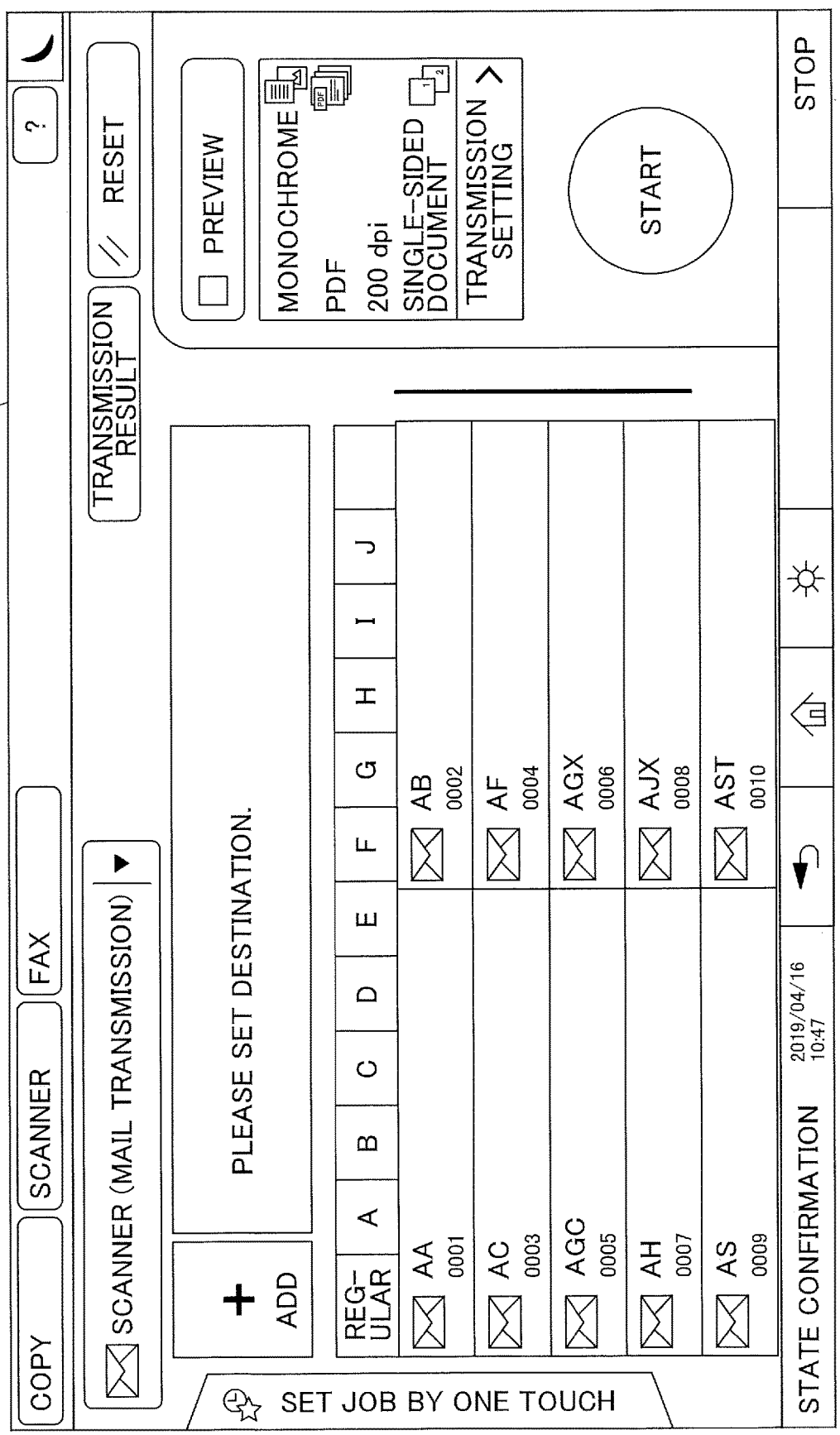
FIG. 14 is a diagram illustrating an example of a native application screen according to the first embodiment of the present invention.

Next, when a native application selection button 309 such as the scanner displayed in the home screen 308 is selected, the internal function operation unit 25 displays a native application screen 311 as illustrated in FIG. 14.

Figure 11:
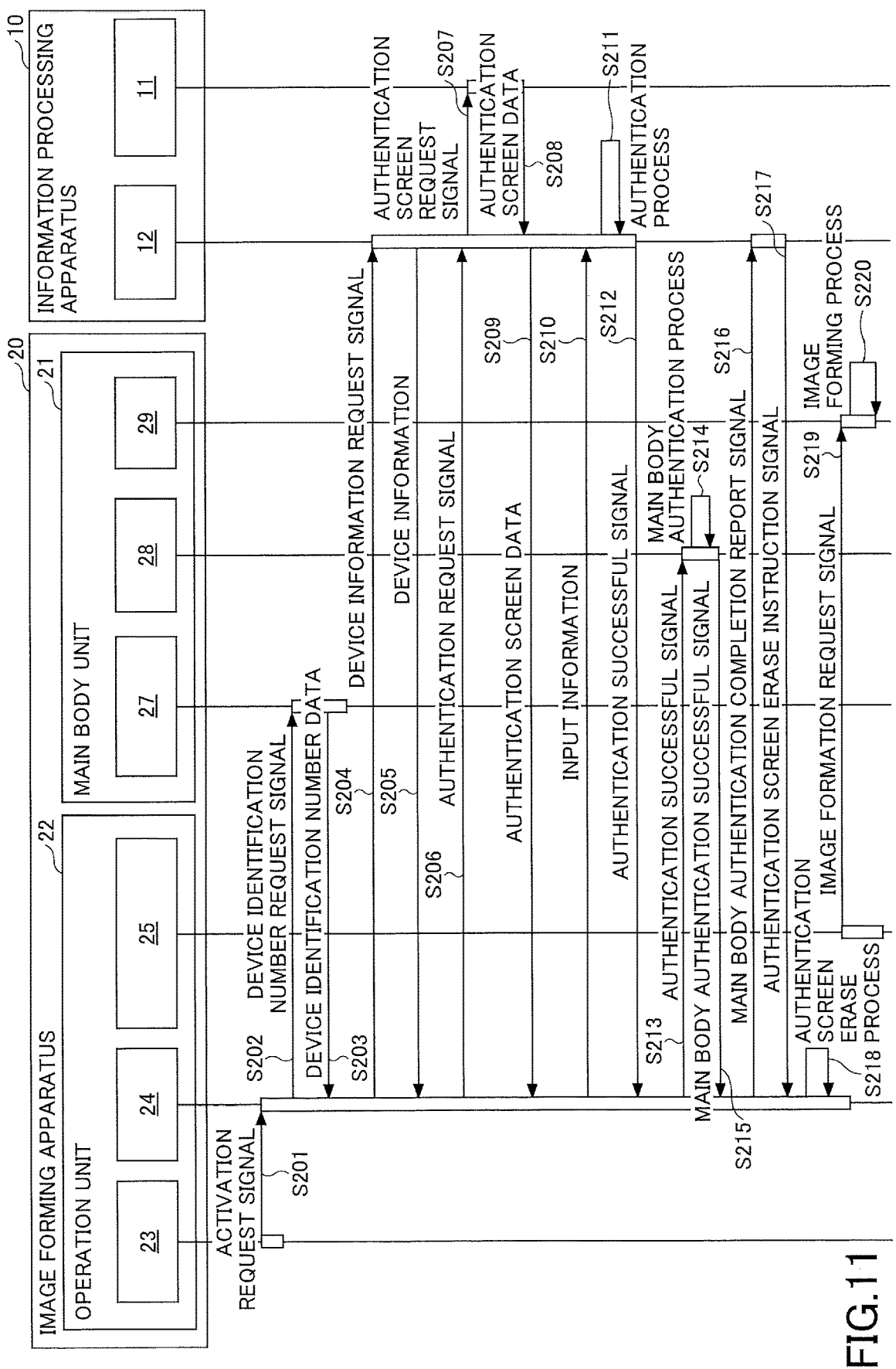
FIG. 11 is a diagram illustrating an example of a sequence of a main body authentication process according to the first embodiment of the present invention.

In step S219, when an operation to request image formation is accepted from a user, the internal function operation unit 25 transmits an image formation request signal to the image forming unit 29, as illustrated in FIG. 11.

In step S220, upon receiving the image formation request signal, the image forming unit 29 executes an image forming process.

Next, a sequence of the authentication process of the web application will be described with reference to FIG. 15.

In step S301, when a browser application selection button 310 is pressed while the home screen 308 of FIG. 13 is displayed, the external function operation unit 26 activates the selected browser application.

Next, in step S302, the external function operation unit 26 transmits a web application activation request signal to the information processing apparatus 10 (or an information processing apparatus that provides the external function in the information processing system). The web application activation request signal is a signal for requesting the activation of the web application.

In step S303, upon receiving the web application activation request signal, the web application executing unit 13 of the information processing apparatus 10 transmits an authentication screen request signal to the storage unit 11. The authentication screen request signal is a signal requesting the transmission of the authentication screen data AD similar to that in step S207 of the main body authentication process.

In step S304, the storage unit 11 transmits the authentication screen data AD to the web application executing unit 13. In step S305, the web application executing unit 13 transmits the authentication screen data AD to the image forming apparatus 20.

Figure 16:
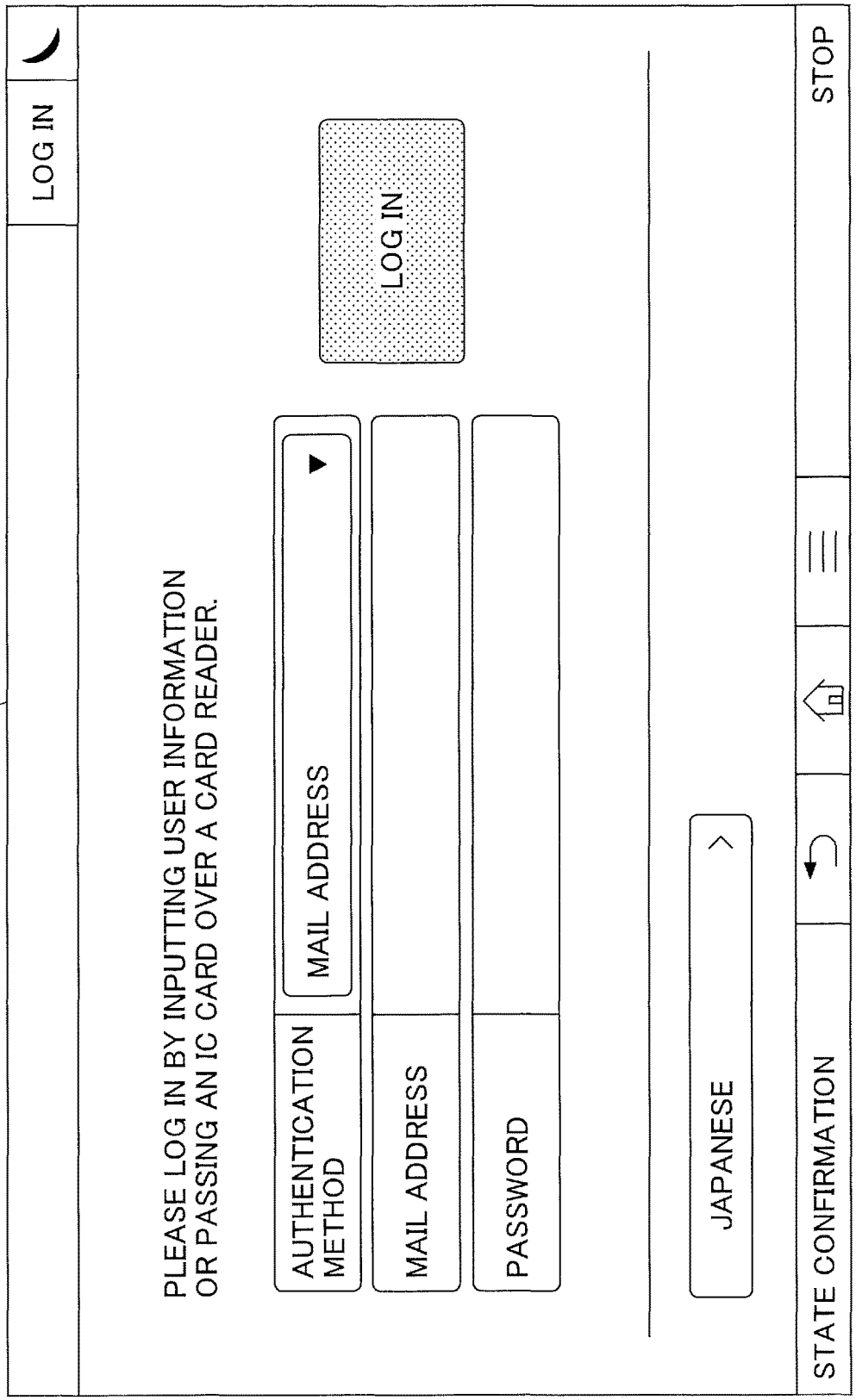
FIG. 16 is a diagram illustrating an example of a web application authentication screen according to the first embodiment of the present invention.

As illustrated in FIG. 16, the external function operation unit 26 displays an authentication screen 312 based on the authentication screen data AD, by the browser function implemented by the browser application. The authentication screen 312 is displayed by the browser application, and, therefore, the authentication screen 312 may be displayed in a screen frame different from the authentication screen 306 illustrated in FIG. 12. For example, the window 307 as illustrated in FIG. 12 may not be displayed.

Returning to FIG. 15, in step S306, upon accepting an operation by a user, the external function operation unit 26 transmits input information to the information processing apparatus 10. Here, the input information is the authentication method, a mail address, a password, etc.

In step S307, the web application executing unit 13 executes the authentication process based on the received input information. Specifically, the web application executing unit 13 determines whether the input information matches the user information RI stored in the storage unit 11. When the web application executing unit 13 determines that the input information matches the user information RI, the authentication is successful, and when the web application executing unit 13 determines that the input information does not match the user information RI, the authentication is unsuccessful In step S308, when authentication is successful, the web application executing unit 13 transmits a web application screen request signal to the storage unit 11. The web application screen request signal is a signal requesting the transmission of web application screen data. The web application screen accepts operations for selecting a web application function.

When the authentication is unsuccessful, the web application executing unit 13 may transmit a message representing authentication unsuccessful such as "authentication error" to the image forming apparatus 20 and prompt the user to re-input the information.

In step S309, upon receiving the web application screen request signal, the storage unit 11 transmits web application screen data to the web application executing unit 13. In step S310, the web application executing unit 13 transmits the web application screen data to the external function operation unit 26.

Figure 17:
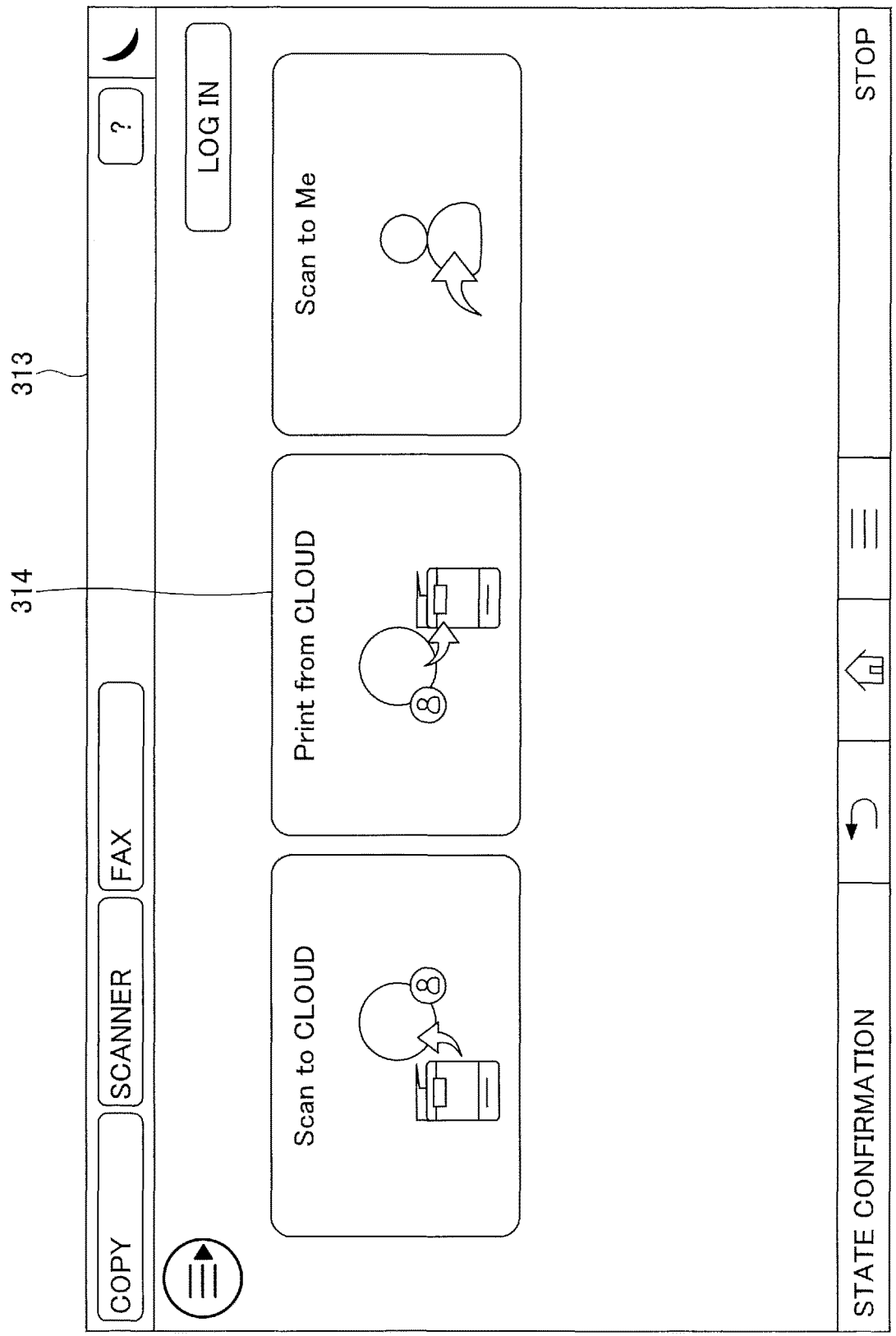
FIG. 17 is a diagram illustrating an example of a web application screen according to the first embodiment of the present invention.

The external function operation unit 26 displays a web application screen 313 based on the received web application screen data as illustrated in FIG. 17. When an external function selection button 314 is pressed by an operation by the user, the external function operation unit 26 implements the selected external function.

In step S311, when the selected external function involves an image forming process such as printing a file on the cloud, the external function operation unit 26 transmits an image formation request signal to the image forming unit 29.

In step S312, upon receiving the image formation request signal, the image forming unit 29 executes the image forming process.

According to the image forming system 1 according to the above-described embodiment, the authentication control unit 24 of the image forming apparatus 20 has the web browser function, so that the authentication screen data AD, which is common to the authentication of the web application of the information processing apparatus 10, can be received and displayed on the operation screen.

Accordingly, in the customization, update, and the like of the authentication function, it is sufficient to modify the authentication screen data AD of the information processing apparatus 10, and, therefore, the updating of each image forming apparatus 20 is not necessary, and the screen data of the web application authentication and the screen data of the main body authentication need not be separately managed. Therefore, it is possible to reduce the load on the management operation of the image forming system 1.

Further, the device registration operation requires an operation in the image forming apparatus 20 in order to register the device identification number stored in the image forming apparatus 20. The image forming apparatus 20 according to the present embodiment displays the device registration screen based on the device registration screen data DD stored in the information processing apparatus 10.

Accordingly, in the customization, update, and the like of the device registration function, it is sufficient to modify the device registration screen data DD of the information processing apparatus 10, and, therefore, the updating of each image forming apparatus 20 is not necessary. Therefore, it is possible to reduce the load of the management operation of the image forming system 1.

Further, the above-described external function is implemented by the web application, and the external function operation unit 26 implements the web browser function, and, therefore, by providing the authentication control unit 24 with the web browser function, the authentication screen can easily be made common.

Further, when the main body authentication is successful, the home screen 308 can become operable by erasing the window 307 on the authentication screen 306. Thus, the selection of native application, the browser application, and the like can be performed immediately after the authentication, making the apparatus easy to operate.

Further, when the activation control unit 23 transmits an activation request signal to the authentication control unit 24 at the time of activation or the time of returning to the standard mode from the energy saving mode, the main body authentication is automatically started, so that the task of performing an operation is reduced.

Note that that time of activation refers to the time before the home screen is displayed on the operation unit 22 of the shared terminal, after the power of the shared terminal is turned on in accordance with the user's operation of the user interface of the shared terminal or when the energy saving state of the shared terminal transitions from a sleep state to a standby state.

The authentication screen may be displayed at a time after the home screen is displayed and when authentication is performed to use a particular function (for example, when a particular native application or web application is activated). The home screen is the basic screen (standby screen) on which icons of multiple functions (applications) that can be used in the shared terminal, can be selected.

In the present embodiment, the image forming apparatus 20 is described as an example of the shared terminal. The scope of the present invention is not limited thereto and is applicable to a variety of apparatuses, terminals, etc., requiring authentication for internal functions, such as an electronic blackboard, an inkjet printer, a smartphone, an imaging apparatus, a video conference terminal, a projector, a multifunction peripheral (MFP), and the like. Therefore, even if the mechanism of each device is different, by applying the present embodiment, it is possible to display a common authentication screen in an external cooperation function such as a web browser function of each device. Accordingly, according to the present embodiment, the load of the management operation can be reduced, regardless of the type of device.

The concept of the internal function and the external function in the present embodiment will be described.

Basically, the internal function is implemented by software or hardware in the apparatus. For example, in the case of the image forming apparatus 20, there is an image forming function such as copying, scanning, printing, or fax communication; a corresponding application; or other native applications.

In the case of an electronic blackboard, there are functions such as an electronic blackboard function for writing in and editing a screen, a screen display function for displaying input information from an external apparatus, and a remote display function for cooperating with other electronic blackboards.

On the other hand, the external function refers to a function such as a web application that is acquired, at least temporarily, by the image forming apparatus 20 (the shared terminal) from an external apparatus and executed, or a function that is implemented by cooperation with an external apparatus such as making an execution request from the device to the external apparatus or acquiring a result of execution.

For example, the external function of the image forming apparatus 20 includes a workflow application which combines components of a plurality of functions such as external authentication, image forming (scanning, printing), image processing (optical character recognition (OCR), a stamp of confidential display, etc.), and file transfer (cloud storage or scan data transfer by mail), or a web application which is used by a single function.

The web application (external function) uses an external cooperation function (a function such as a web browser application or a browser function in or the native application) of the image forming apparatus 20 to accesses a corresponding particular website, and uses the website.

Depending on the function (i.e., application), a function may include both an internal function and an external function, or a function may operate by the cooperation of an internal function and an external function. Therefore, the function may be classified as an internal function or an external function, depending on the main function or the function that is called first.

In the present embodiment, as a result of the main body authentication, the use of a portion of the internal function by a user may be restricted. Similarly, as a result of the web application authentication, the use of a portion of the external function by a user may be restricted.

The authentication control unit 24 may be implemented as one of the native applications. In this case, the authentication control unit 24 is a functional unit that executes the authentication process by reading the authentication application, and the internal function operation unit 25 is a functional unit that implements the operation of the internal function by reading another native application.

Similarly, the browser application of the external function operation unit 26 may be implemented as one of the native applications. In this case, the external function operation unit 26 is the functional unit for reading the browser application and implementing the operation of the external function.

Second Embodiment

A second embodiment will be described below with reference to the drawings. In the second embodiment, when the main body authentication setting is OFF and authentication is performed individually for each native application, the common screen data CD is used, which is the point that is different from the first embodiment. In the description of the second embodiment which follows, differences from the first embodiment are described. Elements having a functional configuration similar to those of the first embodiment are denoted by the same reference numerals as those used in the description of the first embodiment, and the descriptions thereof are omitted.

Figure 18:
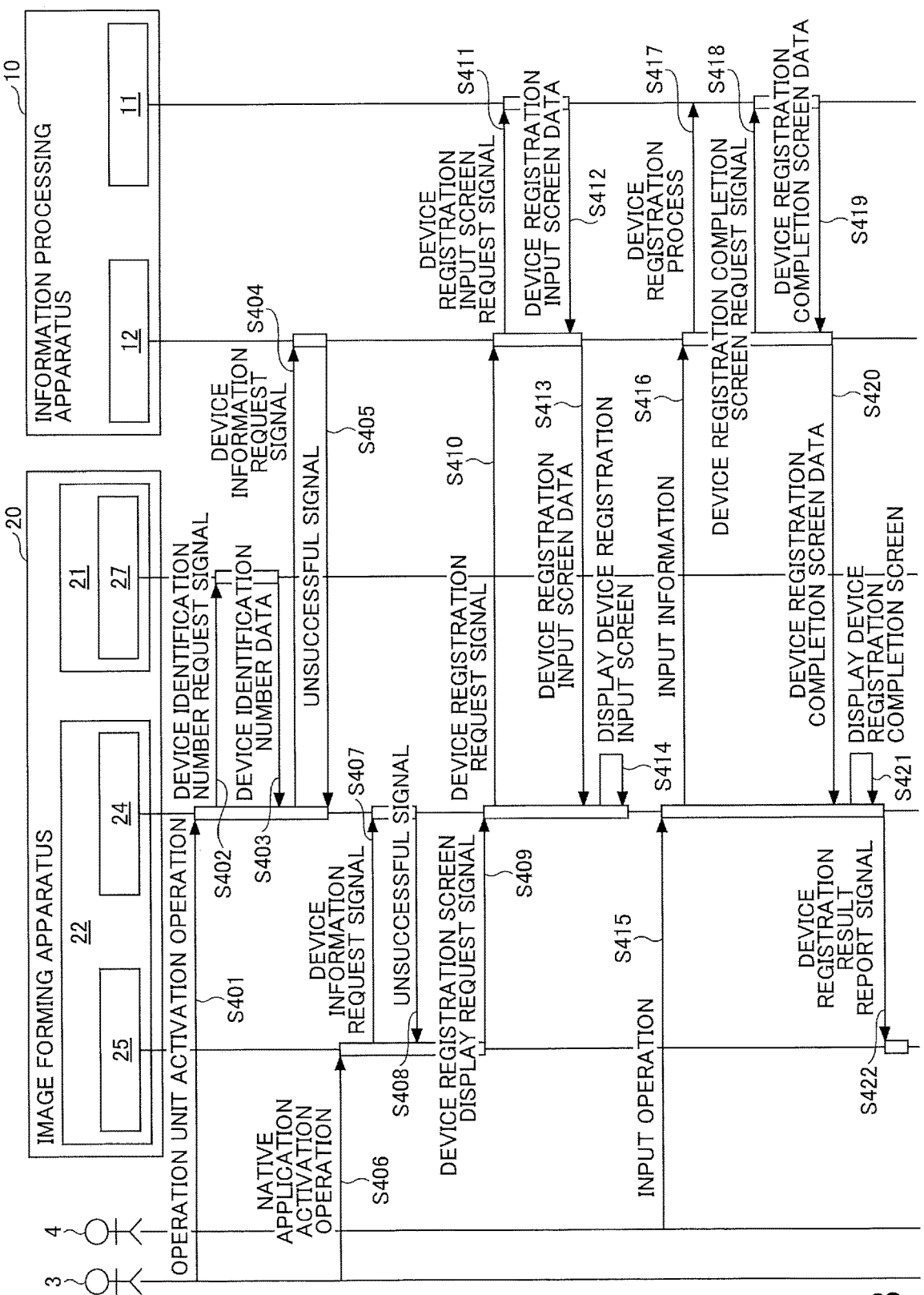
FIG. 18 is a diagram illustrating an example of a sequence of a native application device registration process according to a second embodiment of the present invention.

A sequence of a device registration process (hereinafter referred to as a native application device registration process) after activating the native application will be described with reference to FIG. 18.

As a prerequisite, it is assumed that the main body authentication setting of the image forming apparatus 20 is OFF. Further, it is assumed that the device registration process of the image forming apparatus 20 is not yet executed.

In step S401, when a user 3 executes an operation of activating the operation unit 22, in step S402, the authentication control unit 24 of the operation unit 22 transmits a device identification number request signal to the web API service unit 27. In step S403, the web API service unit 27 transmits device identification number data to the authentication control unit 24.

Next, in step S404, the authentication control unit 24 transmits a device information request signal to the information processing apparatus 10. In step S405, the request processing unit 12 of the information processing apparatus 10 transmits an unsuccessful signal to the image forming apparatus 20 because the device registration process of the image forming apparatus 20 has not yet been executed.

Because the main body authentication setting of the image forming apparatus 20 is OFF, the home screen in which the native application to be activated can be selected, is displayed on the operation unit 22, by the activation operation of step S401, as illustrated in FIG. 13.

In step S406, when the user 3 performs an operation to activate a native application such as the scanner as illustrated in FIG. 13, in step S407, the internal function operation unit 25 transmits a device information request signal to the authentication control unit 24.

Here, the authentication control unit 24 has received the unsuccessful signal in step S405, and, therefore, the device information DI is not acquired. Accordingly, in step S408, the authentication control unit 24 transmits an unsuccessful signal to the internal function operation unit 25.

Next, in step S409, the internal function operation unit 25 transmits a device registration screen display request signal to the authentication control unit 24. The device registration screen display request signal is a signal requesting the authentication control unit 24 to display a device registration screen.

Next, in step S410, the authentication control unit 24 transmits a device registration request signal together with the device identification number data to the information processing apparatus 10. In step S411, the request processing unit 12 of the information processing apparatus 10 transmits a device registration input screen request signal to the storage unit 11.

In step S412, the storage unit 11 transmits device registration input screen data to the request processing unit 12. In step S413, the request processing unit 12 transmits the device registration input screen data to the authentication control unit 24.

In step S414, the authentication control unit 24 displays the device registration input screen 305 similar to that of the first embodiment based on the device registration input screen data by the web browser function.

In step S415, the authentication control unit 24 receives an operation input by an administrator 4 and transmits input information to the information processing apparatus 10 (step S416). In step S417, the request processing unit 12 executes a device registration process.

When the tenant information TI and the user information RI corresponding to the tenant ID, the user ID, and the password included in the input information are registered in the storage unit 11, the request processing unit 12 stores the device identification number represented by the device identification number data received in step S403 as the device information DI in the storage unit 11 in association with the tenant information TI and the user information RI.

Next, in step S418, the request processing unit 12 transmits a device registration completion screen request signal to the storage unit 11. In step S419, the storage unit 11 transmits device registration completion screen data to the request processing unit 12.

The device registration completion screen data is screen data included in the device registration screen data DD and represents a screen in which a message indicating that the device registration has been completed, is arranged.

Subsequently, in step S420, the request processing unit 12 transmits device registration completion screen data to the image forming apparatus 20. In step S421, the authentication control unit 24 of the image forming apparatus 20 displays a device registration completion screen based on the received device registration completion screen data by the web browser function.

In step S422, the authentication control unit 24 transmits a device registration result report signal to the internal function operation unit 25. The device registration result report signal is a signal reporting the result of the device registration process and indicating whether the registration has been successful or unsuccessful, for example.

According to the native application device registration process described above, even when the main body authentication setting is OFF and authentication is performed individually for each native application, the device registration input screen 305 and the device registration completion screen are displayed based on the device registration screen data DD stored in the information processing apparatus 10.

Accordingly, in the customization, update, and the like of the device registration function, it is sufficient to modify the device registration screen data DD of the information processing apparatus 10, and, therefore, the updating of each image forming apparatus 20 is not necessary, and thus the load of the management operation of the image forming system 1 can be reduced.

Figure 19:
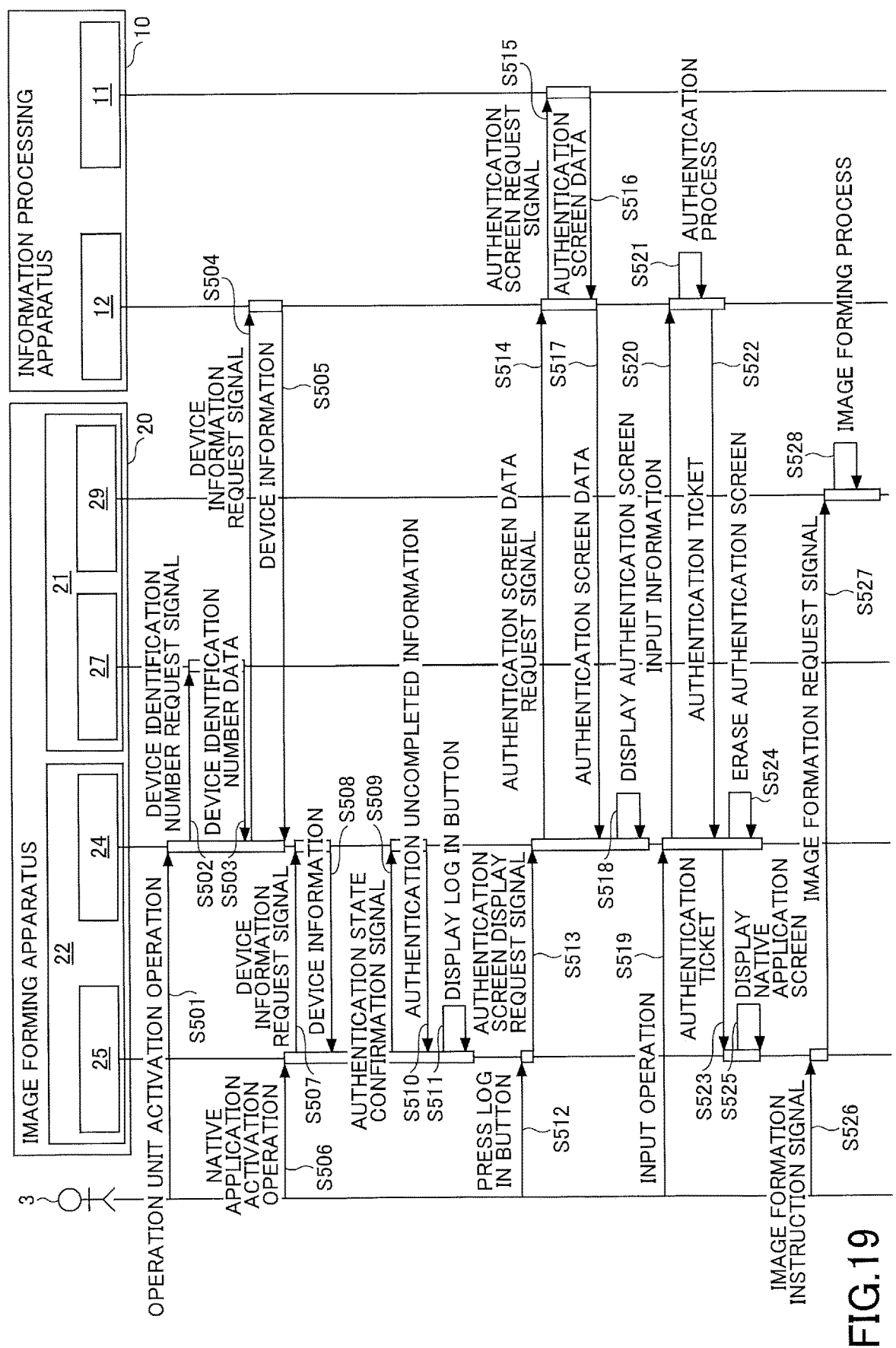
FIG. 19 is a diagram illustrating an example of a sequence of a native application authentication process according to the second embodiment of the present invention.

Next, a sequence of an individual authentication process (hereinafter referred to as a native application authentication process) for each native application will be described with reference to FIG. 19.

As a prerequisite, it is assumed that the main body authentication setting of the image forming apparatus 20 is OFF and the native application device registration process has been executed.

In step S501, when the user 3 executes an operation of activating the operation unit 22, in step S502, the authentication control unit 24 of the operation unit 22 transmits a device identification number request signal to the web API service unit 27. In step S503, the web API service unit 27 transmits device identification number data to the authentication control unit 24.

Next, in step S504, the authentication control unit 24 transmits a device information request signal to the information processing apparatus 10. In step S505, the request processing unit 12 of the information processing apparatus 10 transmits the registered device information DI to the image forming apparatus 20 because the device registration process of the image forming apparatus 20 has already been executed.

The main body authentication setting of the image forming apparatus 20 is OFF, and, therefore, the home screen 308 in which the native application to be activated can be selected, is displayed on the operation unit 22 as illustrated in FIG. 13, by the operation for activation of the step S501.

In step S506, when the user 3 performs an operation to activate the native application such as the scanner as illustrated in FIG. 13, in step S507, the internal function operation unit 25 transmits a device information request signal to the authentication control unit 24.

Here, the authentication control unit 24 has received the device information DI in step S505, and, therefore, the device information DI has been acquired. Accordingly, in step S508, the authentication control unit 24 transmits the device information DI to the internal function operation unit 25.

Next, in step S509, the internal function operation unit 25 transmits an authentication state confirmation signal to the authentication control unit 24. The authentication state confirmation signal is a signal for confirming the authentication state.

The authentication control unit 24 confirms the authentication state. Specifically, when the authentication process has already been executed and the authentication has been completed at some timing in the past, the authentication control unit 24 transmits authentication completed information representing that authentication has been completed to the internal function operation unit 25. Otherwise, the authentication control unit 24 transmits authentication uncompleted information indicating that the authentication is not completed to the internal function operation unit 25.

Here, the main body authentication setting is OFF, and the authentication process is not yet executed. Therefore, in step S510, the authentication control unit 24 transmits authentication uncompleted information to the internal function operation unit 25.

Note that when the main body authentication setting is ON, the authentication process should have been executed before the native application is activated. Therefore, the authentication control unit 24 transmits authentication completed information to the internal function operation unit 25.

Next, in step S511, the internal function operation unit 25 displays a log in button. The log in button is a Graphical User Interface (GUI) that executes an authentication process and accepts operations to use functions that require authentication.

Figure 20:
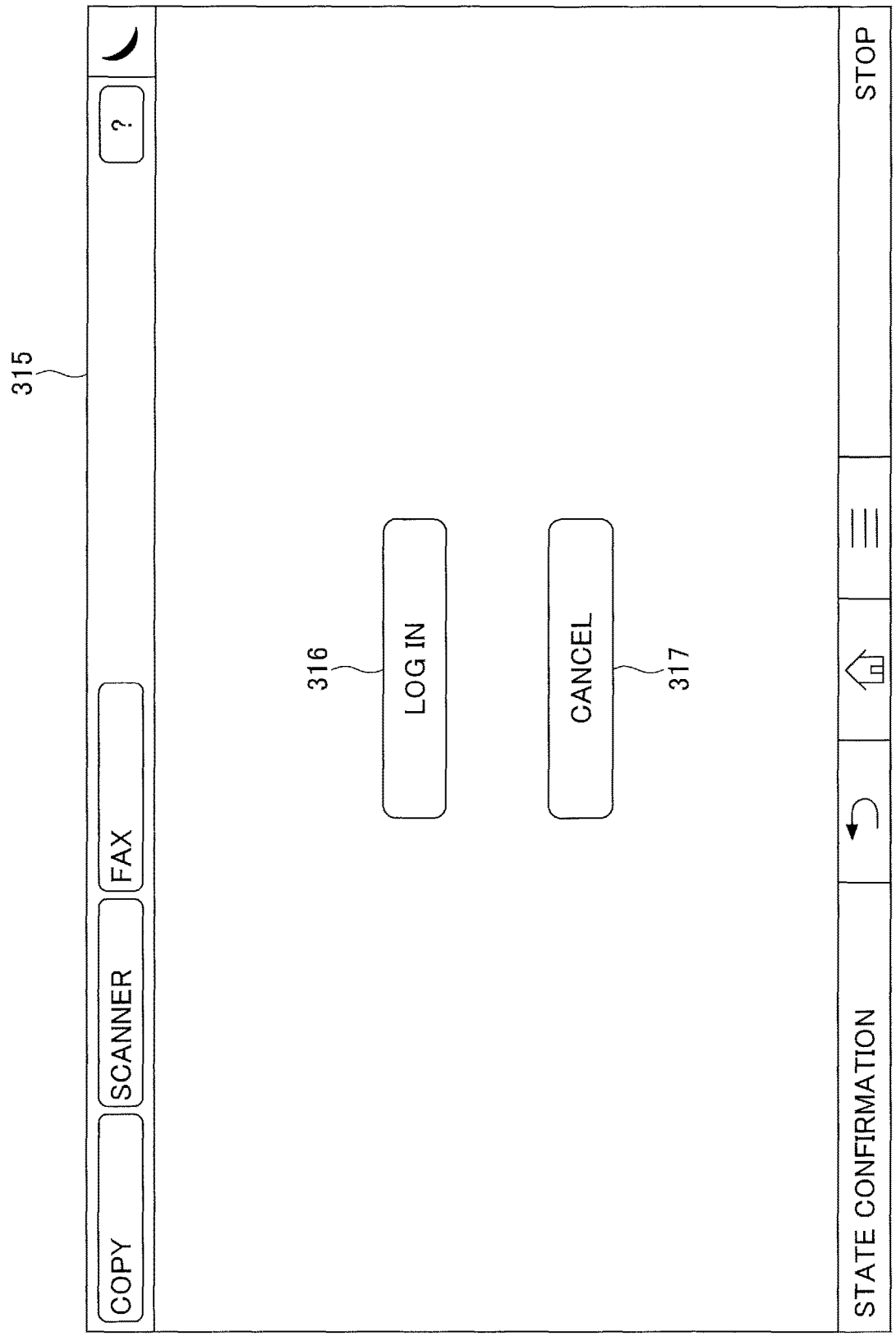
FIG. 20 is a diagram illustrating an example of a native application authentication selection screen according to the second embodiment of the present invention.

Specifically, the internal function operation unit 25 displays a native application authentication selection screen 315 as illustrated in FIG. 20. The native application authentication selection screen 315 includes a log in button 316 and a cancel button 317.

When the cancel button 317 is pressed, the internal function operation unit 25 displays the home screen 308 as illustrated in FIG. 13. Returning to FIG. 19, in step S512, when the log in button 316 is pressed, in step S513, the internal function operation unit 25 transmits an authentication screen display request signal to the authentication control unit 24. The authentication screen display request signal is a signal requesting the authentication control unit 24 to display the authentication screen.

Subsequently, in step S514, the authentication control unit 24 transmits an authentication screen data request signal to the information processing apparatus 10. In step S515, the request processing unit 12 transmits an authentication screen request signal to the storage unit 11.

In step S516, the storage unit 11 transmits the authentication screen data AD to the request processing unit 12. In step S517, the request processing unit 12 transmits the authentication screen data AD to the image forming apparatus 20.

In step S518, the authentication control unit 24 displays the authentication screen 306 based on the authentication screen data AD, by the web browser function, as illustrated in FIG. 12. This authentication screen 306 is displayed in the window 307 that is superimposed on the home screen. Accordingly, unless the window 307 is erased, an operation of the home screen, such as selecting an application icon or viewing a notification message, is not possible.

Note that when the authentication method is selected by the user 3 in the authentication screen 306, the authentication control unit 24 executes the process defined in the script language program included in the authentication screen data AD and changes the input item.

The authentication screen data AD includes information indicating a transmission destination of the input information. In step S519, when the log in button is pressed by the user 3 in the authentication screen 306, in step S520, the input information is transmitted to the information processing apparatus 10 based on information representing a transmission destination of the input information included in the authentication screen data AD. In step S521, the request processing unit 12 executes an authentication process based on the received input information.

In step S522, when the authentication is successful, the request processing unit 12 transmits an authentication ticket. The authentication ticket may be a token and the like, which is data representing successful authentication and is a character string encrypting the user ID.

In step S523, the authentication control unit 24 transmits an authentication ticket to the internal function operation unit 25, and in step S524, the authentication control unit 24 erases the window 307 of the authentication screen 306.

In step S525, the internal function operation unit 25 displays the native application screen 311 of an application such as a scanner activated in step S506.

After receiving an operation instructing to form an image from the user 3 in step S526, in step S527, the internal function operation unit 25 transmits an image formation request signal to the image forming unit 29.

In step S528, the image forming unit 29 executes an image forming process when the image formation request signal is received.

According to the native application authentication process described above, even when the main body authentication setting is OFF and authentication is performed individually for each native application, the authentication screen 306 is displayed based on the authentication screen data AD stored in the information processing apparatus 10.

Accordingly, in the customization, update, and the like of the authentication function, it is sufficient to modify the authentication screen data AD of the information processing apparatus 10, and, therefore, the updating of each image forming apparatus 20 is not necessary, and thus the load of the management operation of the image forming system 1 can be reduced.

According to the image forming system 1 according to the present embodiment, when the main body authentication setting is OFF, the authentication screen data AD, common to the first authentication screen data and the second authentication screen data, is used as the authentication screen data (third authentication screen data), which is used when individual authentication (third authentication) for each native application is performed. This reduces the load of development of native applications and management operations.

Third Embodiment

A third embodiment will be described with reference to the drawings. The third embodiment differs from the first embodiment in that an authentication method is set for each tenant. In the description of the third embodiment which follows, differences from the first embodiment are described. Elements having a functional configuration similar to those of the first embodiment are denoted by the same reference numerals as those used in the description of the first embodiment, and the descriptions thereof are omitted.

Figure 21:
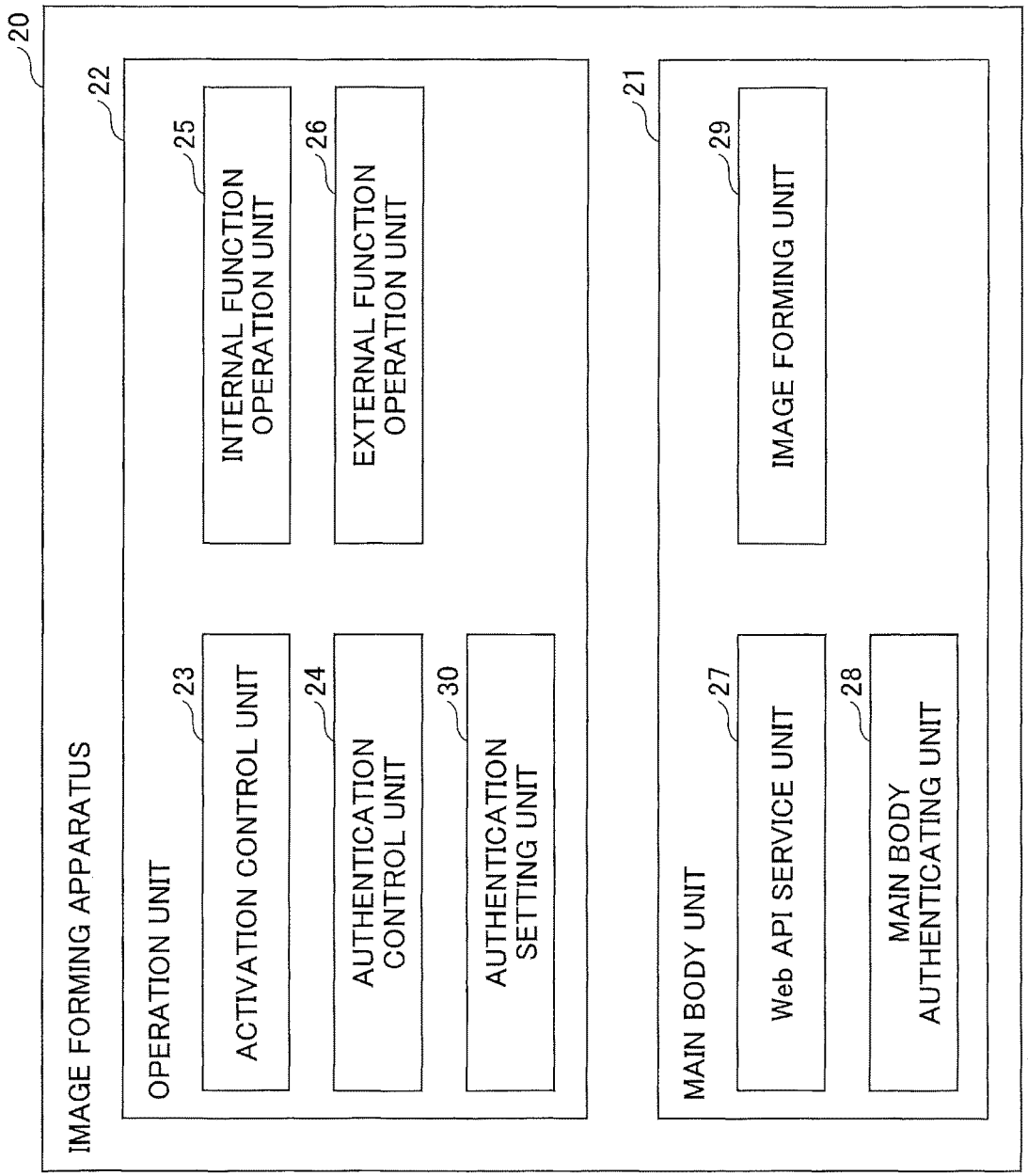
FIG. 21 is a diagram illustrating an example of functions of an image forming apparatus according to a third embodiment of the present invention.

The functions included in the image forming apparatus 20 according to the present embodiment will be described with reference to FIG. 21.

The operation unit 22 of the image forming apparatus 20 further includes an authentication setting unit 30.

The authentication setting unit 30 sets the main body authentication upon accepting an operation by a user (usually an administrator of the image forming apparatus 20). Specifically, the authentication setting unit 30 selects whether the main body authentication setting is to be ON or OFF, and when the main body authentication setting is ON, the authentication setting unit 30 accepts an operation of selecting standard authentication or system authentication, and stores the input setting.

Figure 22:
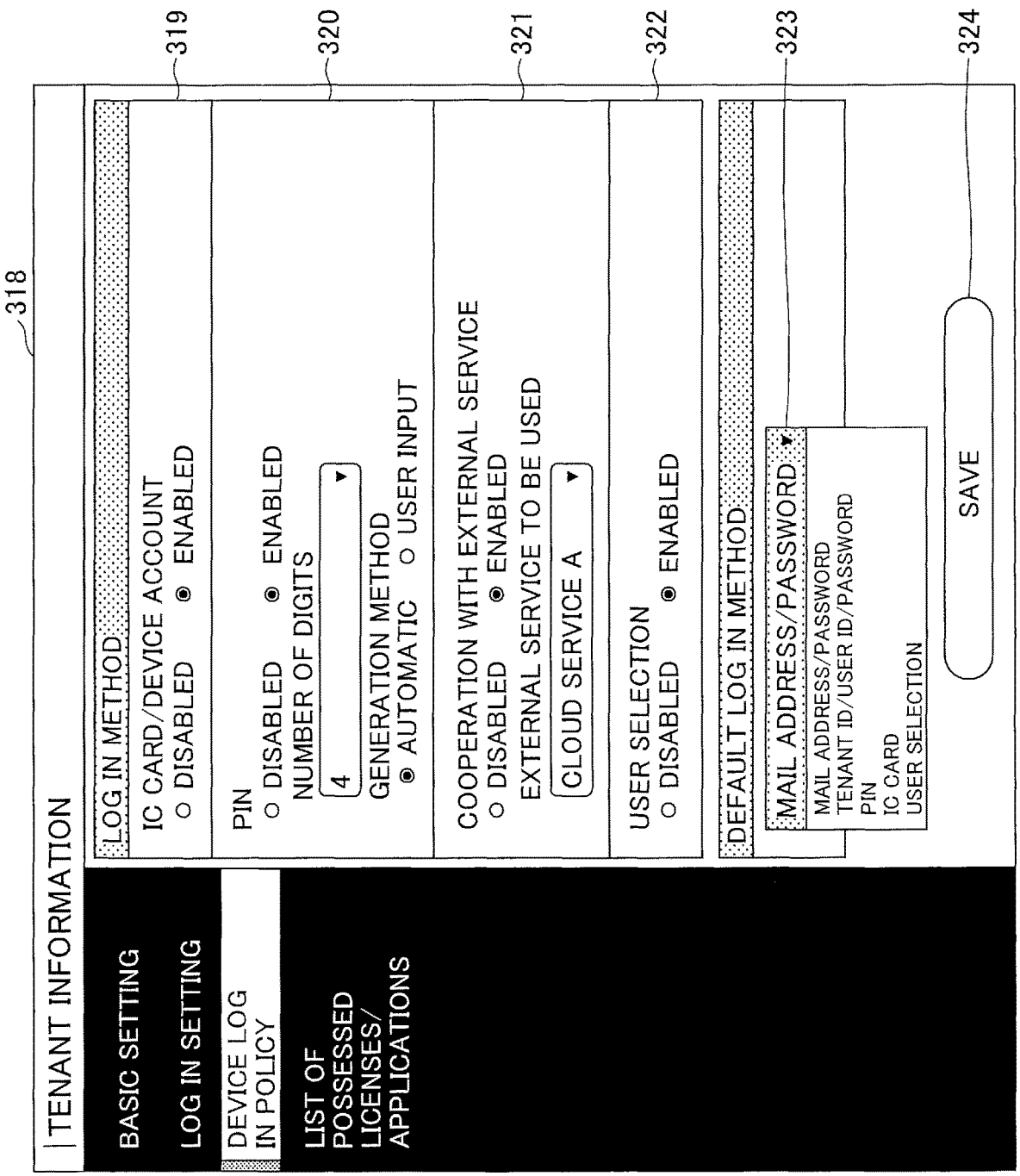
FIG. 22 is a diagram illustrating an example of an authentication method setting screen according to the third embodiment of the present invention.

The tenant information TI stored in the storage unit 11 of the information processing apparatus 10 includes information representing an authentication method. Specifically, as illustrated in FIG. 22, the information processing apparatus 10 displays an authentication method setting screen 318 included in the management screen of the tenant information and accepts an operation of selecting the authentication method (an operation for enabling the authentication method) by the tenant manager who manages the setting of each tenant.

The data representing the authentication method setting screen 318 is provided by a WEB application executed by the information processing apparatus 10. A terminal, such as a personal computer (PC) used by the tenant manager, displays the authentication method setting screen 318 by accessing the information processing apparatus 10 through the browser function.

The authentication method setting screen 318 includes an IC card enablement setting field 319, a Personal Identification Number (PIN) enablement setting field 320, an external service enablement setting field 321, a user selection setting field 322, a default log in method setting field 323, and a save button 324.

In the IC card enablement setting field 319, the tenant manager is prompted to select whether to enable authentication using an IC card. When authentication using an IC card is enabled, the default log in method setting field 323 includes the option "IC card".

In the PIN enablement setting field 320, the tenant manager is prompted to select whether to enable authentication using PIN. When authentication using PIN is enabled, "PIN" is included as an option in the default log in method setting field 323.

In the PIN enablement setting field 320, when authentication using PIN is enabled, the number of digits of the PIN is selected from, for example, 4 to 16, and the PIN generation method is selected from "automatic" or "user input".

When the save button 324 is pressed while the method of generating the PIN is set to "automatic", the information processing apparatus 10 executes batch processing and the like to generate a sequence of numerical values of the set number of digits by random numbers and the like for each user, and reports the generated sequence of numerical values as the PIN of each user by e-mail and the like.

When the method of generating the PIN is set to "user input", a terminal such as a PC used by each user accesses the information processing apparatus 10 upon accepting the operation of each user, and displays a PIN setting screen, which will be described later. The PIN of each user is determined upon accepting an input operation from each user.

In the external service enablement setting field 321, the tenant manager is prompted to select whether to enable authentication using an external service. An external service is a service for managing user information outside the information processing apparatus 10, such as a commercial cloud service and the like.

In the external service enablement setting field 321, when authentication using an external service is enabled, the external service to be used is further selected from the selectable external services which have been set beforehand.

When the authentication using the external service is enabled, the information processing apparatus 10 executes batch processing and the like, acquires the user information from the selected external service, and stores the acquired user information in the storage unit 11. The information processing apparatus 10 executes an authentication process based on the user information acquired from the external service in the main body authentication process to be described later.

In the user setting field 322, the tenant manager is prompted to select whether to enable the user selection authentication method. When the user selection authentication method is enabled, the default log in method setting field 323 includes a "user selection" option.

In the default log in method setting field 323, the tenant manager is prompted to select the default authentication method of the main body authentication. Options include "mail address/password", "tenant ID/user ID/password", "PIN", "IC card", and "user selection".

The "mail address/password" is an authentication method by which each user inputs a mail address and password. When this authentication method is selected and authentication using an external service is enabled, in the main body authentication process to be described later, the information processing apparatus 10 performs authentication based on the mail address and the password included in the user information acquired from the external service.

The "tenant ID/user ID/password" is an authentication method in which each user inputs a tenant ID, user ID, and password.

The "mail address/password" and "tenant ID/user ID/password" are initially included among the authentication method options.

Alternatively, "PIN", "IC card", and "user selection" are included among the authentication method options when the corresponding setting is enabled as described above.

When the save button 324 is pressed by the tenant manager, the information processing apparatus 10 applies the contents of the input setting in the tenant information of the storage unit 11.

Note that each user may operate a terminal capable of communicating with the information processing apparatus 10, to input a user ID, a mail address, a password, and the like, and log in to the management screen with an account set for each user. The terminal operated by each user displays the management screen provided by the WEB application of the information processing apparatus 10.

Each user's terminal can display the management screen and accept operations such as confirming and changing the user information RI, such as the user ID, mail address, and password.

Figure 23:
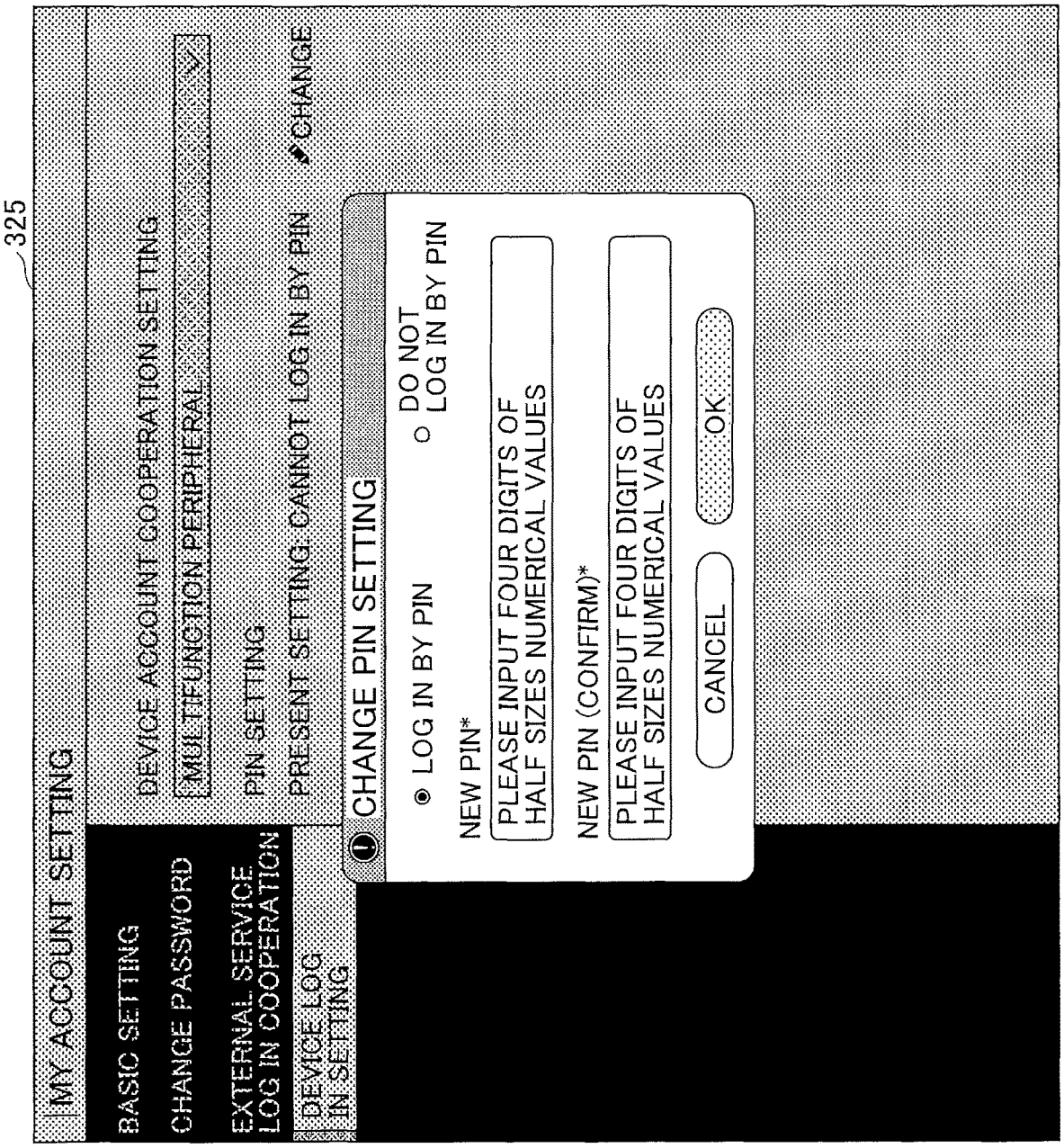
FIG. 23 is a diagram illustrating an example of a PIN setting screen according to the third embodiment of the present invention.

When authentication using PIN is enabled in the authentication method setting screen 318, a PIN setting screen 325 illustrated in FIG. 23 is included as a part of the management screen.

The PIN setting screen 325 prompts each user to select whether to use PIN as the authentication method. When PIN is to be used, and the method of generating the PIN is set to "user input" in the authentication method setting screen 318, the user is prompted to input a PIN.

Note that for a user for whom the setting indicates a PIN is not to be used, even if the default authentication method of the main body authentication is "PIN", an authentication method other than PIN will be the default method. Further, in the terminal of the user for whom the setting indicates a PIN is not to be used, the authentication method cannot be changed to using "PIN" in the various main body authentication screens described later.

Figure 24:
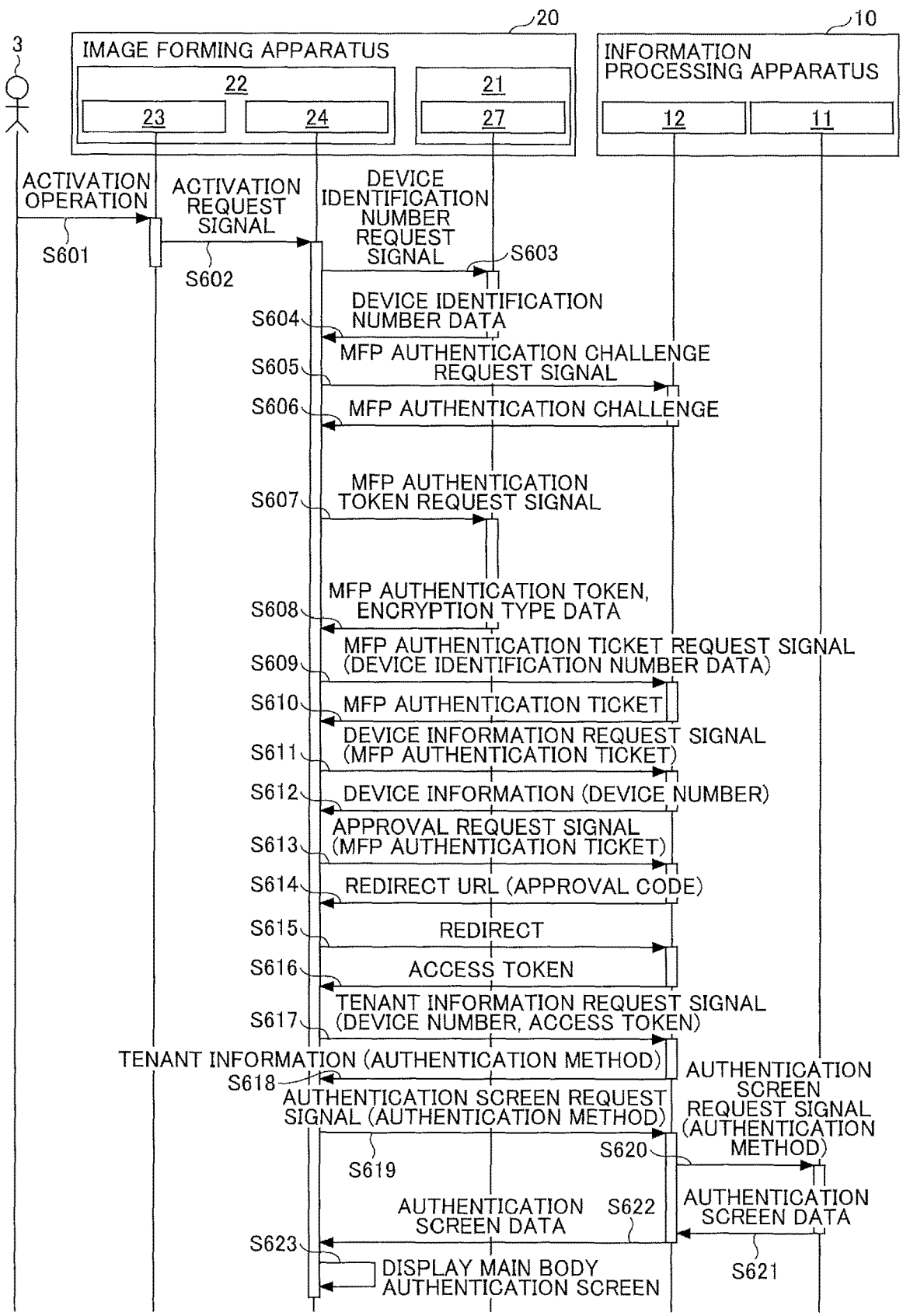
FIG. 24 is a diagram illustrating an example of a sequence of a main body authentication screen display process according to the third embodiment of the present invention.

Next, a process of displaying the main body authentication screen according to the present embodiment will be described with reference to FIG. 24.

In step S601, when the user 3 performs an operation to activate the image forming apparatus 20, in step S602, the activation control unit 23 of the operation unit 22 transmits an activation request signal to the authentication control unit 24. In step S603, the authentication control unit 24 transmits a device identification number request signal to the main body unit 21. In step S604, the web API service unit 27 transmits device identification number data to the authentication control unit 24.

Next, in step S605, the authentication control unit 24 transmits a challenge request signal for MFP authentication to the information processing apparatus 10. The challenge request signal for MFP authentication is a signal requesting the issuance of a challenge for MFP authentication. The challenge for MFP authentication is a data sequence generated based on a random number in order to authenticate the image forming apparatus 20 such as an MFP (hereinafter referred to as MFP authentication), and is a type of one-time password used in the so-called challenge response authentication technology.

In order to transmit the device information DI to the image forming apparatus 20, the information processing apparatus 10 hereinafter executes MFP authentication in the process up to step S610. This process may be executed prior to the transmission process of the device information DI described in the other embodiments.

In step S606, the request processing unit 12 issues the challenge for MFP authentication and transmits the challenge to the image forming apparatus 20. In step S607, the authentication control unit 24 transmits a token request signal for MFP authentication to the web API service unit 27. The token request signal for MFP authentication is a signal requesting the issuance of a token for MFP authentication. The token request signal for MFP authentication includes the challenge for MFP authentication.

In step S608, the web API service unit 27 transmits a token for MFP authentication and encryption type data to the authentication control unit 24. The token for MFP authentication is a character string encrypted based on the device information DI. The encryption type data is data representing the encryption type used when the web API service unit 27 creates the token for MFP authentication.

Next, in step S609, the authentication control unit 24 transmits an MFP authentication ticket request signal to the information processing apparatus 10. The MFP authentication ticket request signal is a signal requesting the issuance of an MFP authentication ticket and includes the device identification number data acquired in step S604. An MFP authentication ticket is data indicating that MFP authentication has been successful.

In step S610, the request processing unit 12 executes MFP authentication and transmits an MFP authentication ticket to the image forming apparatus 20. Next, in step S611, the authentication control unit 24 transmits a device information request signal to the information processing apparatus 10. The device information request signal includes an MFP authentication ticket.

In step S612, the request processing unit 12 transmits the device information DI to the image forming apparatus 20. The device information DI includes a device number for identifying the image forming apparatus 20. When the device registration process is not performed (not registered), an unsuccessful signal is transmitted and the same processes as those of steps S106 to S114 in the device registration process illustrated in FIG. 9 are executed.

In step S613, upon receiving the device information DI, the authentication control unit 24 transmits an approval request signal to the information processing apparatus 10. The approval request signal is a signal requesting the information processing apparatus 10 to approve of the transmission of the tenant information TI. The approval request signal includes the MFP authentication ticket.

In step S614, the request processing unit 12 transmits a redirect Uniform Resource Locater (URL), including an approval code indicating approval, to the image forming apparatus 20. In step S615, the authentication control unit 24 executes redirect with respect to the redirect URL. The redirect URL is a URL for issuing an access token of the information processing apparatus 10.

An access token is an encrypted character string used to request the transmission of tenant information. In step S616, the request processing unit 12 generates an access token and transmits the access token to the image forming apparatus 20.

In step S617, the authentication control unit 24 transmits a tenant information request signal to the information processing apparatus 10. The tenant information request signal is a signal requesting the transmission of the tenant information TI. The tenant information request signal includes a device number included in the device information DI acquired in step S612 and the access token acquired in step S616.

In step S618, the request processing unit 12 transmits the tenant information TI to the image forming apparatus 20. The tenant information TI includes the authentication method set in the aforementioned authentication method setting screen 318.

Next, in step S619, the authentication control unit 24 transmits an authentication screen request signal to the information processing apparatus 10. The authentication screen request signal is a signal requesting the transmission of an authentication screen. The authentication screen request signal includes the authentication method acquired in step S618.

In step S620, upon receiving the authentication screen request signal, the request processing unit 12 transmits an authentication screen request signal including the authentication method to the storage unit 11.

In step S621, the storage unit 11 transmits the authentication screen data AD corresponding to the authentication method to the request processing unit 12. In step S622, the request processing unit 12 transmits the authentication screen data AD to the image forming apparatus 20.

In step S623, the authentication control unit 24 displays a main body authentication screen based on the authentication screen data AD.

Figure 25:
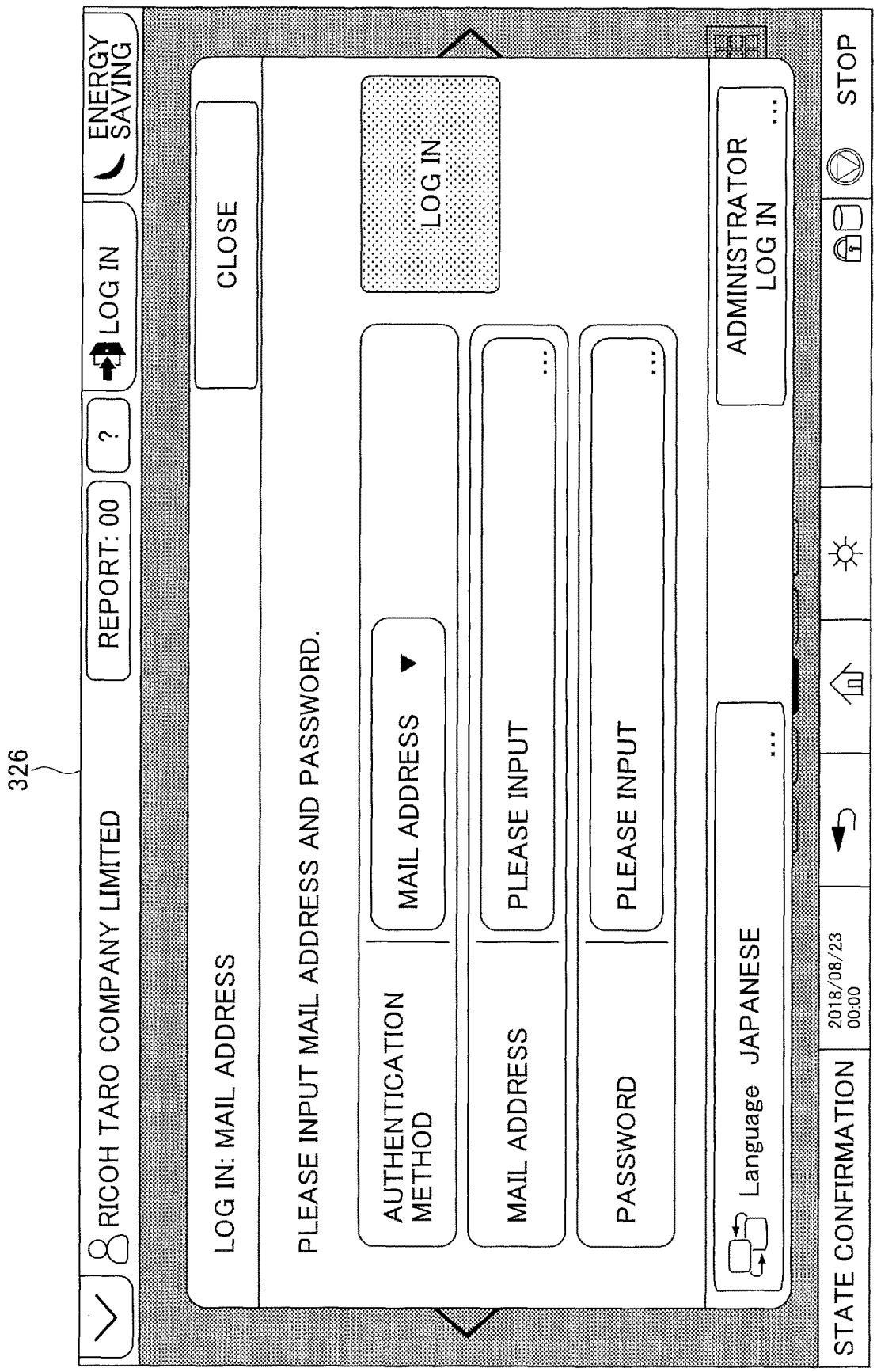
FIG. 25 is a diagram illustrating an example of a main body authentication screen according to the third embodiment of the present invention.

When the default authentication method is set to "mail address/password", a main body authentication screen 326 displayed is a screen that includes the mail address and password as input items, as illustrated in FIG. 25.

Further, the authentication method can be changed, among the options as those in the default login method setting field 323 in the authentication method setting screen. When the authentication method is selected by the user 3, the authentication control unit 24 executes the process defined in the script language program included in the authentication screen data AD, to change the input item. In this case, the authentication screen data AD transmitted from the information processing apparatus 10 may include screen data of all the selectable authentication methods.

Figure 26:
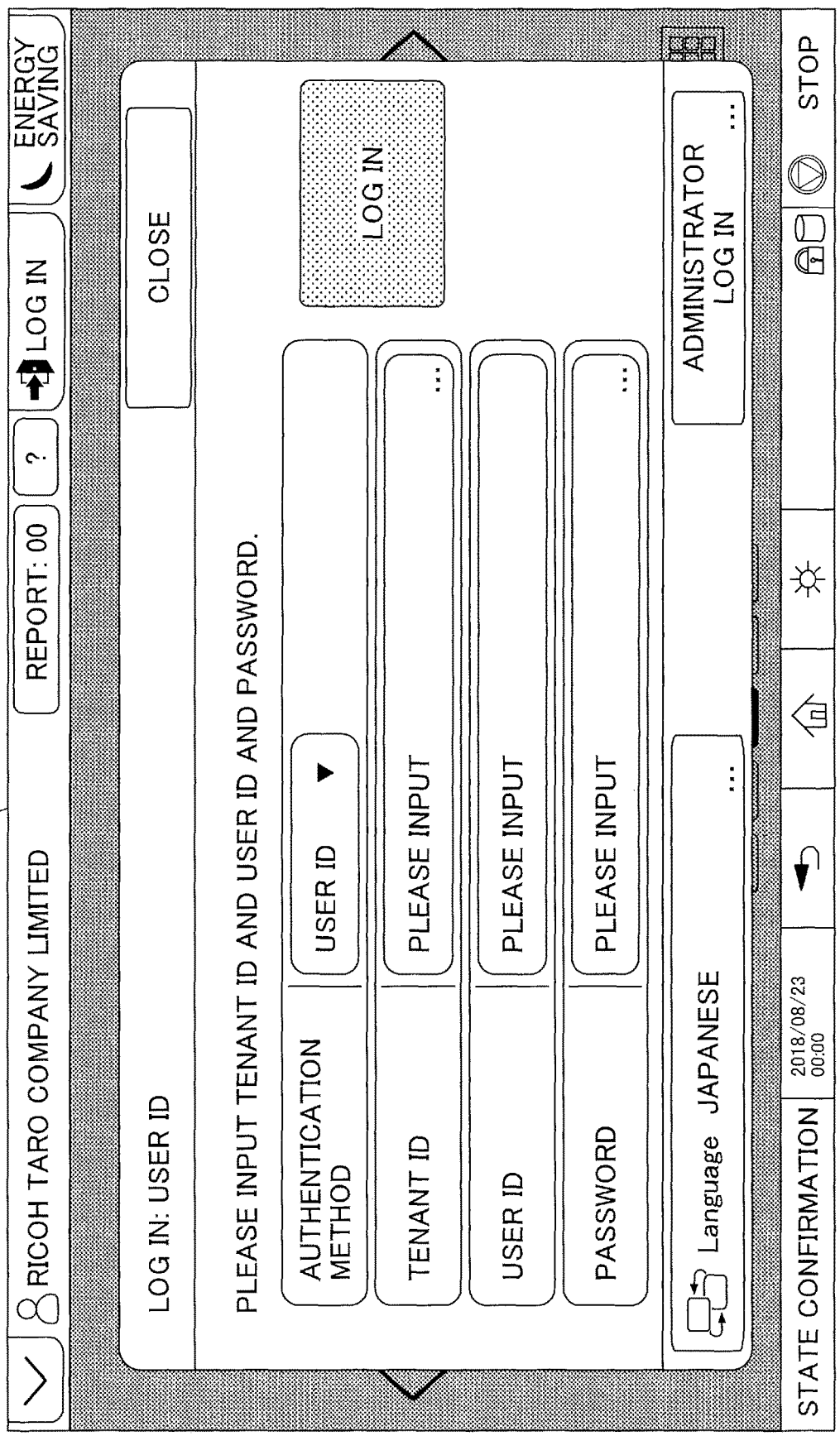
FIG. 26 is a diagram illustrating another example of a main body authentication screen according to the third embodiment of the present invention.

When the default authentication method is set to "tenant ID/user ID/password", a main body authentication screen 327 displayed is a screen that includes the tenant ID, user ID, and password as input items, as illustrated in FIG. 26.

Figure 27:
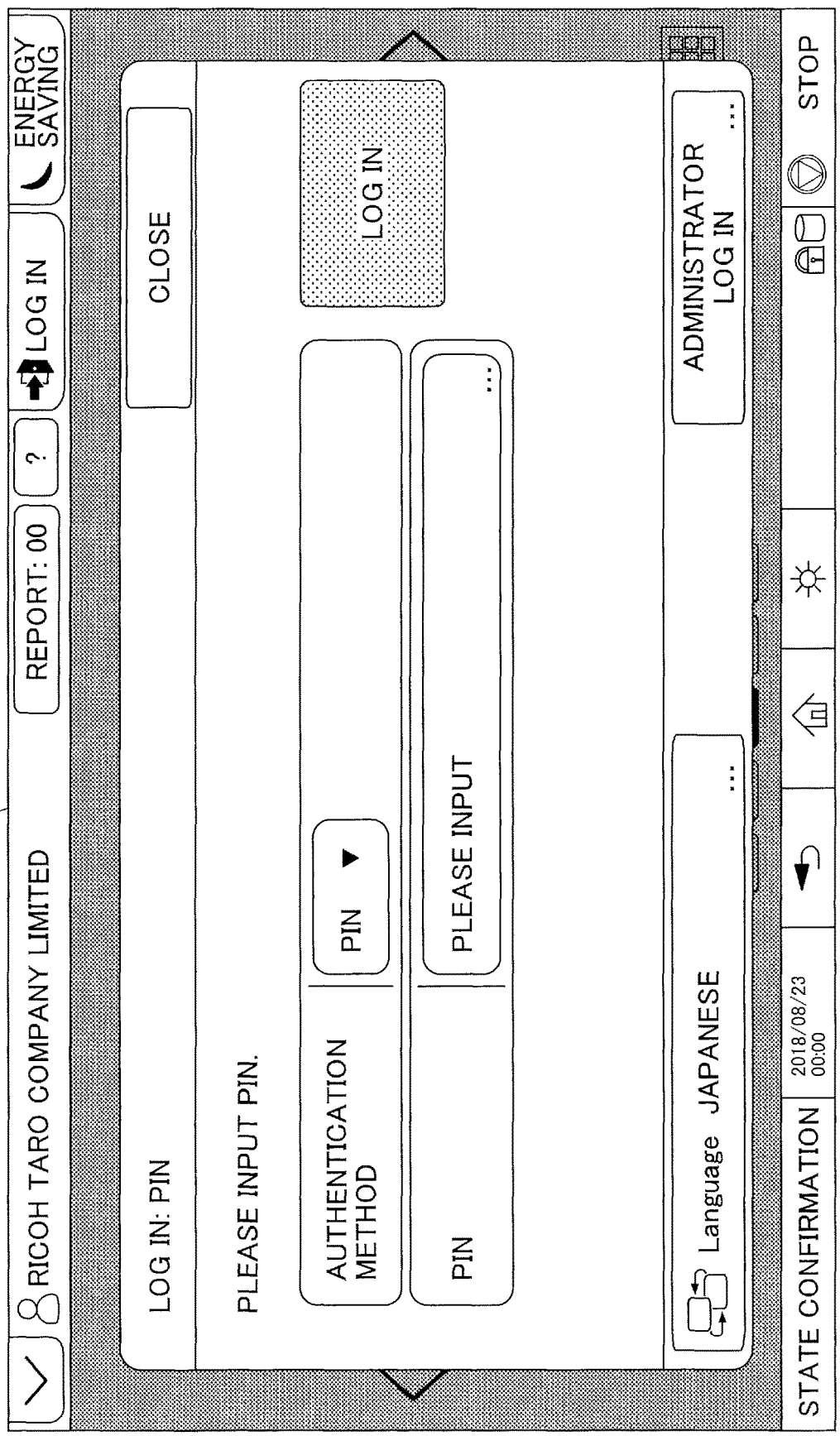
FIG. 27 is a diagram illustrating another example of a main body authentication screen according to the third embodiment of the present invention.

When the default authentication method is set to "PIN", a main body authentication screen 328 displayed is a screen that includes PIN as the input item, as illustrated in FIG. 27.

When the default authentication method is set to "IC card", the main body authentication screen displayed does not include any input items and includes a message requesting to bring an IC card in close contact.

Figure 28:
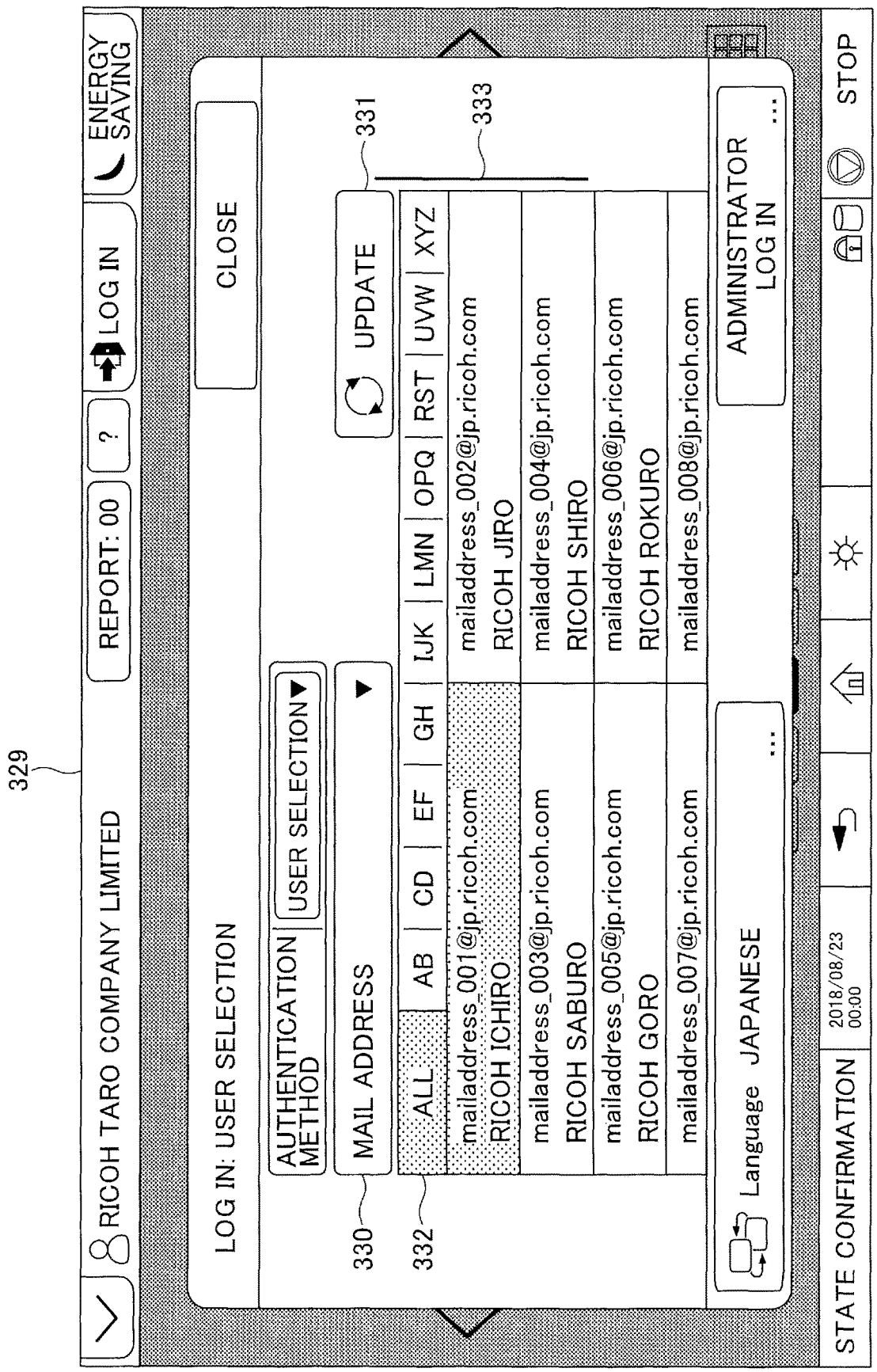
FIG. 28 is a diagram illustrating another example of a main body authentication screen according to the third embodiment of the present invention.

When the default authentication method is set to "user selection", a main body authentication screen 329 displayed is a screen in which a list of users who can log in is displayed, as illustrated in FIG. 28, and a user to log in is selected from the displayed list. Specifically, the main body authentication screen 329 includes a display order selection field 330, an update button 331, an index selection tab 332, and a scroll bar 333.

The display order selection field 330 is a GUI for changing the display order. When the display order is changed, the authentication control unit 24 specifies the display order after the change and executes a user information updating process to be described later. The index selection tab 332 will be in a state where "ALL" are selected.

The update button 331 is a GUI for displaying the latest user list. When the update button 331 is pressed, the authentication control unit 24 executes a user information update process described later. Further, the index selection tab 332 is in a state where "ALL" are selected.

The index selection tab 332 is a GUI for selecting an initial character of the mail address and limiting the mail addresses to be displayed on the screen, when the display order is mail address. Here, when the display order is the user ID, the initial character of the user ID may be selected.

When the initial character is changed, the authentication control unit 24 specifies the initial character after the change and executes an user information updating process to be described later.

The scroll bar 333 is a GUI for scrolling a list of users to be displayed on the screen. When the number of displayed users per page is set in advance and a scrolling operation is performed in a range exceeding the number of displayed users, the authentication control unit 24 executes a user information updating process to be described later.

When the above-described GUI is operated, the authentication control unit 24 executes a process specified in a script language program included in the authentication screen data AD to change the input item.

Figure 29:
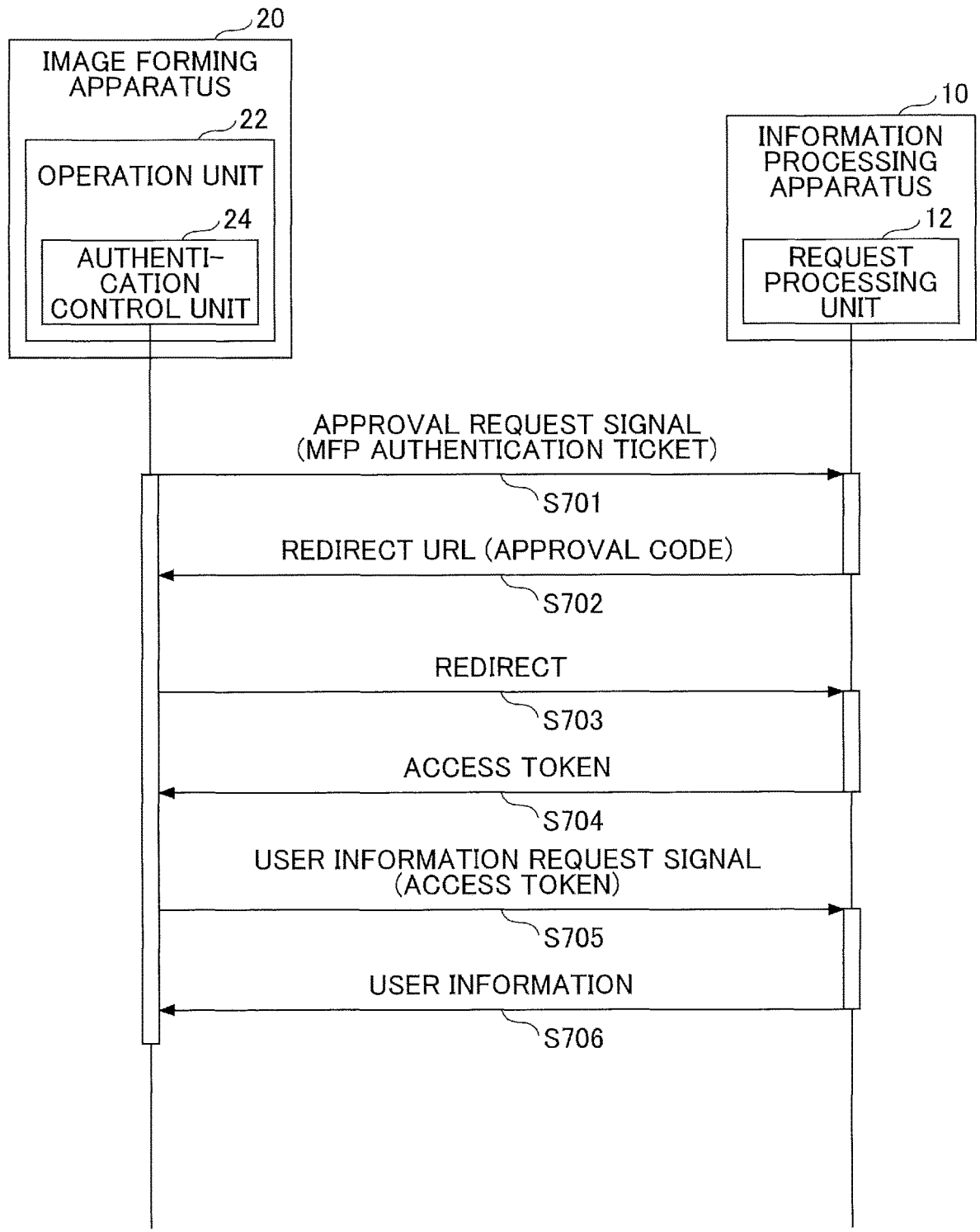
FIG. 29 is a diagram illustrating an example of a sequence of a user information updating process according to the third embodiment of the present invention.

When the initial display of the main body authentication screen 329 and the above-described display selection field 330, the update button 331, the index selection tab 332, and the scroll bar 333 are operated, the authentication control unit 24 starts the user information updating process illustrated in FIG. 29.

In step S701, the authentication control unit 24 transmits an approval request signal to the information processing apparatus 10. The approval request signal includes an MFP authentication ticket. In step S702, the request processing unit 12 transmits a redirect URL including an approval code indicating approval to the image forming apparatus 20.

In step S703, the authentication control unit 24 executes redirect with respect to the redirect URL. The redirect URL is a URL for issuing an access token of the information processing apparatus 10. In step S704, the request processing unit 12 generates an access token and transmits the access token to the image forming apparatus 20.

In step S705, the authentication control unit 24 transmits a user information request signal to the information processing apparatus 10. The user information request signal is a signal requesting the transmission of the user information RI. The user information request signal includes the access token acquired in step S704. The user information request signal includes information specifying the display order, the number of pages, the initial character, and the like.

In step S706, the request processing unit 12 acquires list data of the user information from the user information RI of the storage unit 11 based on the specified information, and transmits the acquired list data to the image forming apparatus 20.

When the user to be logged in is selected, a main body authentication process described below is executed by using a user ID indicating the selected user as the input information. When the user to be logged in is selected, the authentication control unit 24 may display a screen on which the password is input. In this case, the authentication control unit 24 executes the main body authentication process described below by using, as input information, the user ID indicating the selected user and the input password.

Figure 30:
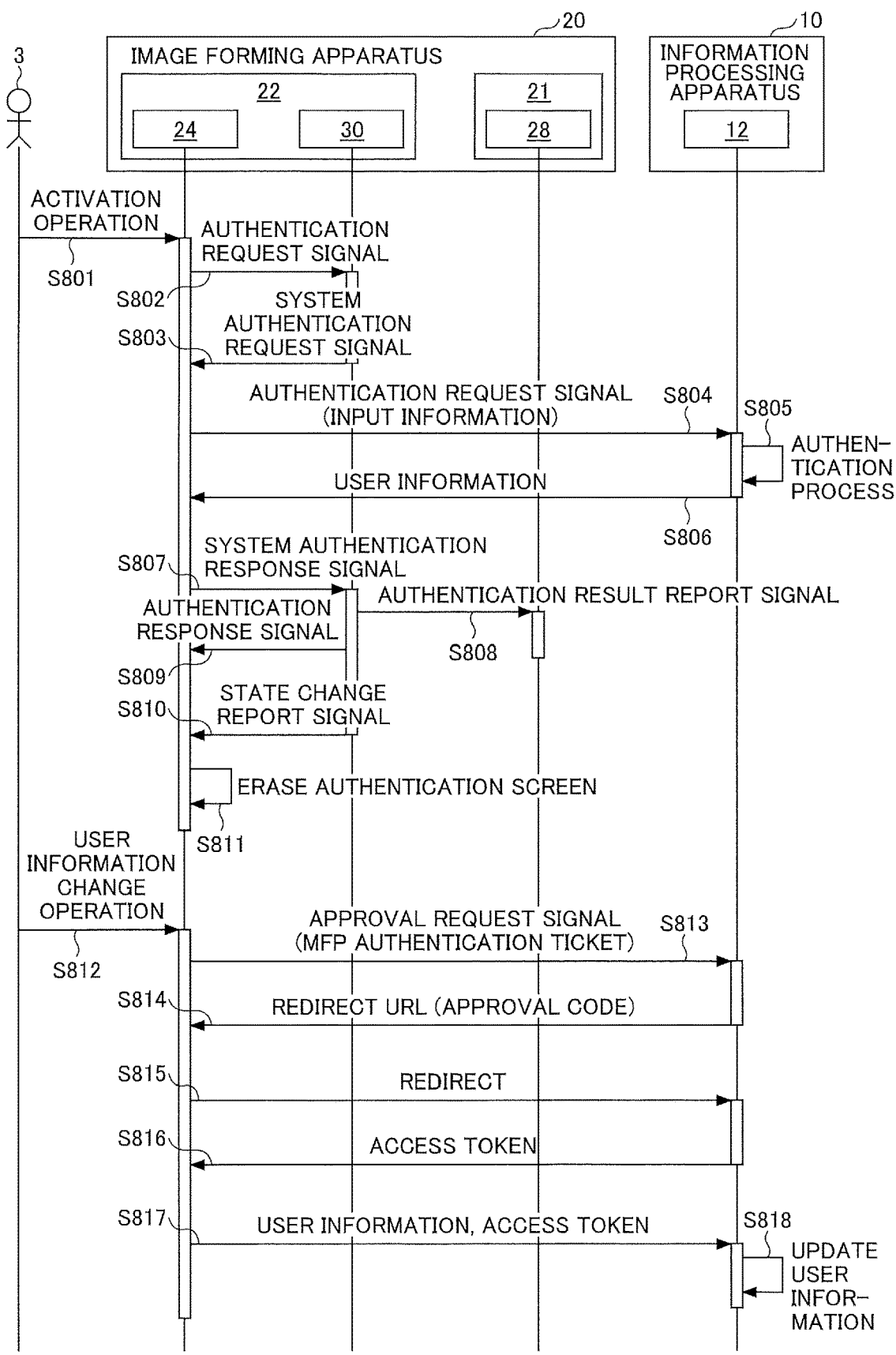
FIG. 30 is a diagram illustrating an example of a sequence of the main body authentication processing according to the third embodiment of the present invention.

FIG. 30 is a diagram illustrating an example of a sequence of the main body authentication process according to the third embodiment.

In step S801, upon accepting an input operation of the user 3 to the main body authentication screen, in step S802, the authentication control unit 24 transmits an authentication request signal to the authentication setting unit 30. In step S803, when the main body authentication is ON and system authentication is selected, the authentication setting unit 30 transmits a signal requesting system authentication (system authentication request signal) to the authentication control unit 24.

Next, in step S804, the authentication control unit 24 transmits an authentication request signal to the information processing apparatus 10. The authentication request signal includes the input information acquired by the input operation of step S801. The input information differs depending on the authentication method selected in each main body authentication screen.

In step S805, the request processing unit 12 executes an authentication process based on the input information corresponding to the selected authentication method. In step S806, when the authentication process is successfully completed, the request processing unit 12 transmits the user information RI of the user 3 to the image forming apparatus 20. When the authentication process is unsuccessful, the request processing unit 12 transmits an HTTP status code, such as 400, 401, and 402, to the image forming apparatus 20.

In step S807, the authentication control unit 24 transmits a system authentication response signal to the authentication setting unit 30. The system authentication response signal is a signal that reports the result of authentication in response to the system authentication request signal transmitted in step S803. In step S808, the authentication setting unit 30 transmits an authentication result report signal to the main body authenticating unit 28. In step S809, an authentication response signal is transmitted to the authentication control unit 24.

The authentication response signal is a signal indicating a response to the authentication request signal transmitted in step S802. The authentication result included in the system authentication response signal transmitted in step S807 is directly reflected to the content of the response.

Next, in step S810, the authentication setting unit 30 transmits a state change report signal to the authentication control unit 24. The state change report signal is a signal for reporting a change in the login state. For example, if the authentication process is successful, the state change report signal indicates that the logout state has changed to the login state. Conversely, if the authentication process is unsuccessful, the state change report signal indicates that no change has occurred from the logout state.

In step S811, when the state change report signal indicates that the logout state has changed to the login state, the authentication control unit 24 deletes the main body authentication screen. Thus, the home screen is displayed on the operation unit 22, and the native application, the browser application, and the like can be selected.

Further, a process may be executed to synchronize the information of the user managed by the image forming apparatus 20 with the user information RI stored in the storage unit 11 of the information processing apparatus 10.

Specifically, in step S812, when the user information is changed by an operation of the user 3 after logging in, in step S813, the authentication control unit 24 transmits an approval request signal to the information processing apparatus 10. The approval request signal includes an MFP authentication ticket. In step S814, the request processing unit 12 transmits a redirect URL including an approval code indicating approval to the image forming apparatus 20.

In step S815, the authentication control unit 24 executes redirect with respect to the redirect URL. The redirect URL is a URL for issuing an access token of the information processing apparatus 10. In step S816, the request processing unit 12 generates an access token and transmits the access token to the image forming apparatus 20.

In step S817, the authentication control unit 24 transmits the user information after the change and the access token to the information processing apparatus 10. In step S818, the request processing unit 12 updates the user information RI stored in the storage unit 11.

According to the image forming system 1 according to the present embodiment, the image forming apparatus 20 acquires the authentication method set for each tenant from the information processing apparatus 10 and displays a main body authentication screen according to the acquired authentication method. Therefore, the user does not need to select the authentication method individually, and the tenant manager does not need to change the setting for each user, but only needs to make a setting once, so that it is more convenient than the method of selecting the authentication method for each user.

Further, according to the image forming system 1 described above, the default authentication method set for each tenant can be changed individually by the user. Therefore, a high degree of flexibility in selecting the authentication method for each user is possible.

In each of the above-described embodiments, when the authentication process for main body authentication is unsuccessful, the user may be able to log in as a guest user who can use some of the functions of the image forming apparatus 20.

Accordingly, in a case where the system authentication is set, even when communication with the information processing apparatus 10 is not possible due to, for example, a failure of communication facilities, some of the functions of the image forming apparatus 20 can be used by the user.

Each of the embodiments described above may be suitably combined. For example, the common authentication screen data AD stored in the storage unit 11 of the information processing apparatus 10 may be used as the first authentication screen data, the second authentication screen data, and the third authentication screen data. Similarly, the common device registration screen data DD stored in the storage unit 11 of the information processing apparatus 10 may be used as the device registration screen data used for the first authentication, the second authentication, and the third authentication.

Also, as the authentication screen data for each authentication method according to the third embodiment, the common authentication screen data AD stored in the storage unit 11 of the information processing apparatus 10 may be used. In this case, the authentication screen data AD includes multiple pieces of authentication screen data whose input items differ for each authentication method. Further, the authentication screen data of the default authentication method set for each tenant may be used for any one of the first authentication, the second authentication, and the third authentication.

The group of apparatuses described in each embodiment represents only one of a plurality of computing environments for carrying out the embodiments disclosed herein.

In some embodiments, the information processing apparatus 10 may be configured as an information processing system, such as a cloud service or a web service, including a plurality of computing devices (information processing apparatuses), such as a server cluster. The plurality of computing devices are configured to communicate with each other via any type of communication link, including a network, a shared memory, and the like, and may perform the processes disclosed herein.

Figure 9:
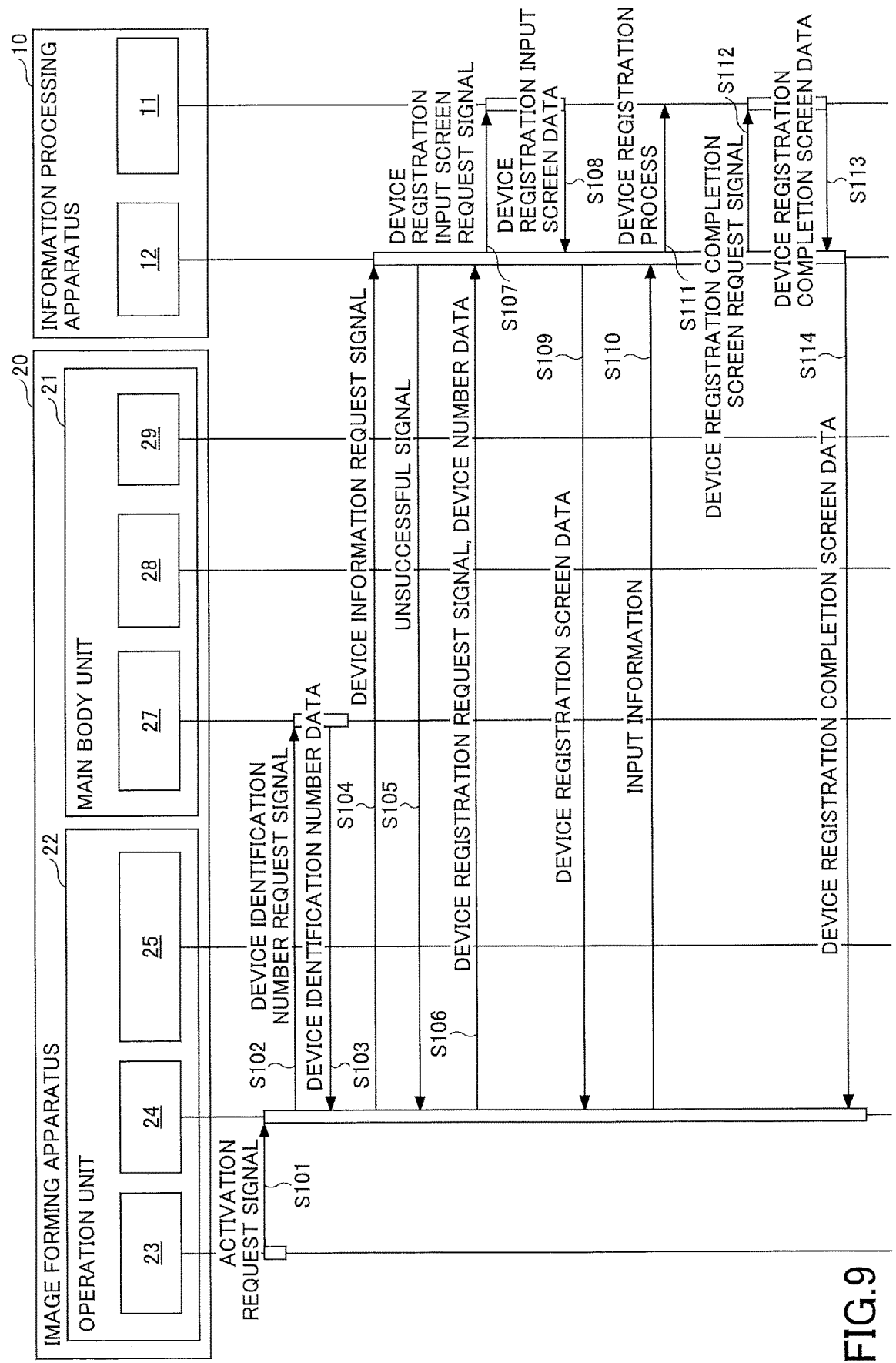
FIG. 9 is a diagram illustrating an example of a sequence of a device registration process according to the first embodiment of the present invention.
Figure 15:
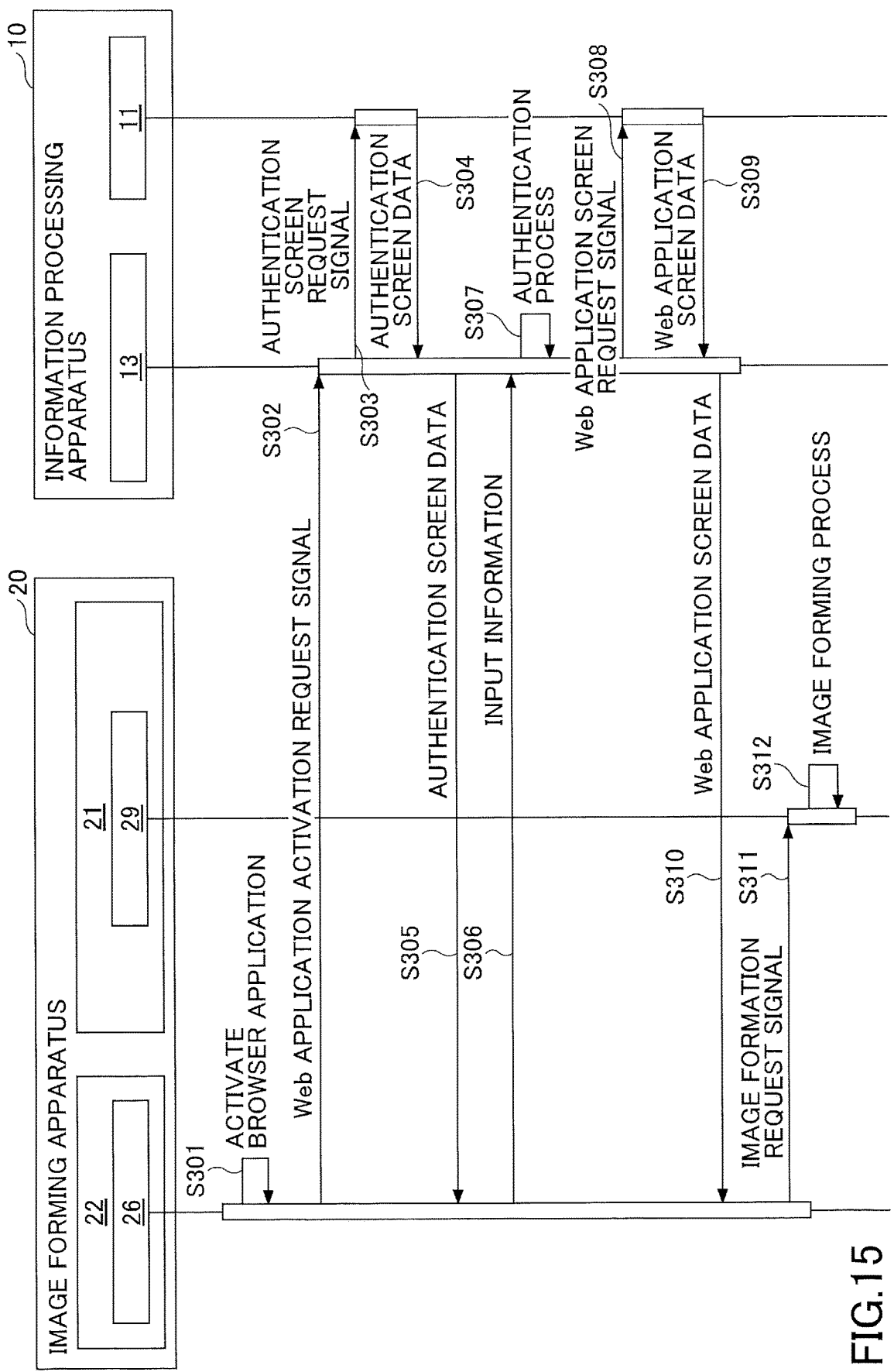
FIG. 15 is a diagram illustrating an example of a sequence of a web application authentication process according to the first embodiment of the present invention.

Further, the information processing apparatus 10 and the image forming apparatus 20 can be configured to share the disclosed processing steps, for example, those described in FIG. 9, FIG. 11, or FIG. 15, in various combinations. The elements of the information processing apparatus 10 (information processing system) and the image forming apparatus 20 may be grouped into a single server apparatus or may be divided into a plurality of apparatuses. For example, an information processing system may configured by the cooperation of different information processing apparatuses having respective functional units, such as an information processing apparatus for storing screen information such as an authentication screen, an information processing apparatus for performing the first and second authentication processes, an information processing apparatus including a web application for providing an external function, and the like.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

In each of the above-described embodiments, the image forming apparatus 20 is illustrated as an example of the shared terminal. However, the shared terminal is not limited to the image forming apparatus, as long as the apparatus is provided with the communication function. The shared terminal may be, for example, a projector (PJ), an output apparatus such as a digital signage, a Head Up Display (HUD) device, an industrial machine, a medical device, a network home appliance, a connected car, a notebook PC, a mobile phone, a tablet terminal, a game machine, a Personal Digital Assistant (PDA), a digital camera, a wearable PC, a desktop PC, or the like.

The application program, such as the native application and the browser application, installed in the image forming apparatus 20 may be installed in an information processing apparatus, such as a user's PC, a mobile terminal, and a smartphone. That is, the above-described operation unit 22 may be included in an apparatus other than the image forming apparatus 20.

According to one embodiment of the present invention, the load of system management operations can be reduced.

The authentication system, the shared terminal, and the authentication method are not limited to the specific embodiments described in the detailed description, and variations and modifications may be made without departing from the spirit and scope of the present invention.

What is claimed is:

1. An authentication system comprising:
a shared terminal; and
at least one information processing apparatus coupled to the shared terminal via a communication network, wherein
the shared terminal includes:
an authentication controller configured to, upon detecting that the shared terminal is activated, acquire authentication screen data, from the at least one information processing apparatus, for authentication performed for using an internal function of the shared terminal, display an authentication screen based on the acquired authentication screen data, and transmit, to the at least one information processing apparatus, input information that is input to the displayed authentication screen by a user; and
an internal function operator configured to display a screen for using the internal function of the shared terminal, upon acquiring information indicating that an authentication process, which is performed based on the input information at the at least one information processing apparatus, is successful,
wherein the authentication controller acquires information indicating an authentication method that is set from the at least one information processing apparatus, and displays the authentication screen based on the authentication method indicated in the acquired information,
the information indicating the authentication method includes information indicating a default authentication method and an enabled authentication method, and
the authentication controller displays the authentication screen based on the default authentication method, and upon accepting an operation of selecting the enabled authentication method, the authentication controller changes the displayed authentication screen to the authentication screen based on the selected enabled authentication method.

2. The authentication system according to claim 1, wherein
the authentication performed for using the internal function is a first authentication, and the authentication screen data for performing the first authentication is first authentication screen data, and
the shared terminal further includes:
an external function operator configured to display second authentication screen data transmitted from the at least one information processing apparatus, for a second authentication performed for using, at the shared terminal, an external function provided to the shared terminal by the authentication system, and wherein
the first authentication screen data and the second authentication screen data are stored as identical authentication screen data in the at least one information processing apparatus, and
the first authentication screen data and the second authentication screen data are called by the authentication controller or the external function operator and are displayed on an operation screen of the shared terminal.

3. The authentication system according to claim 2, wherein
the external function is implemented by a web application program,
the external function operator is implemented by a web browser application, and
the web browser application displays a screen defined in Hyper Text Markup Language (HTML) data returned as a result of a process by the web application program.

4. The authentication system according to claim 1, wherein
the authentication controller is configured by an application including a web browser function, and
the application displays the authentication screen based on the authentication screen data for the authentication performed for using the internal function, by using the web browser function.

5. The authentication system according to claim 4, wherein
the authentication controller erases the authentication screen according to information received from the authentication system when the authentication for using the internal function is successful, to display the screen for using the internal function.

6. The authentication system according to claim 1, wherein
the shared terminal further includes:
a main body authenticator configured to determine whether to approve of execution of the internal function upon detecting that authentication for using the internal function is successful outside the shared terminal, when the shared terminal is set to execute the authentication for using the internal function, wherein
the authentication controller acquires, from the authentication system, information indicating that the authentication is successful outside the shared terminal when the authentication for using the internal function performed by the authentication system is successful, and transmits the acquired information to the main body authenticator when the shared terminal is set to execute the authentication for using the internal function, and
the main body authenticator determines that the authentication performed for using the internal function is successful and approves of the execution of the internal function, upon receiving the information indicating that the authentication is successful outside the shared terminal.

7. The authentication system according to claim 1, wherein the authentication controller acquires device registration screen data from the at least one information processing apparatus, displays the acquired device registration screen data, and registers the shared terminal with the authentication system as a terminal for cooperating with the authentication system.

8. The authentication system according to claim 1, wherein
the shared terminal further includes:
an activation controller configured to cause the authentication controller to request the authentication for using the internal function, to outside the shared terminal, upon detecting that the shared terminal is activated or the shared terminal has returned to a standard mode from an energy saving mode.

9. The authentication system according to claim 1, wherein
the authentication performed for using the internal function is first authentication, and the authentication screen data for performing the first authentication is first authentication screen data, the internal function operator requests the authentication controller to display the authentication screen when performing third authentication after usage of the internal function has started, the authentication controller displays third authentication screen data for the third authentication, transmitted from the at least one information processing apparatus, the first authentication screen data and the third authentication screen data are stored as identical authentication screen data in the at least one information processing apparatus, and the first authentication screen data and the third authentication screen data are called by the authentication controller and are displayed on an operation screen of the shared terminal.

10. The authentication system according to claim 1, wherein when an authentication method performed by cooperating with an external service is set for performing the authentication, the at least one information processing apparatus acquires user information from an apparatus that provides the external service set in advance, and performs the authentication process based on the acquired user information.

11. The authentication system according to claim 1, wherein when an authentication method performed by selecting a user is set for performing the authentication, the at least one information processing apparatus transmits the authentication screen data including information indicating a list of users, and the authentication controller displays the authentication screen data and accepts a selection of a user to be authenticated from the list of users.

12. A shared terminal shared by a plurality of users, the shared terminal comprising:

an authentication controller configured to acquire authentication screen data, upon detecting that the shared terminal is activated, from an information processing apparatus coupled to the shared terminal via a communication network, for authentication performed for using an internal function of the shared terminal, display an authentication screen based on the acquired authentication screen data, and transmit, to the information processing apparatus, input information that is input to the displayed authentication screen by a user; and an internal function operator configured to display a screen for using the internal function of the shared terminal, upon acquiring a signal indicating that an authentication process, which is performed based on the input information at the information processing apparatus, is successful, wherein the authentication controller acquires information indicating an authentication method that is set from the information processing apparatus, and displays the authentication screen based on the authentication method indicated in the acquired information, the information indicating the authentication method includes information indicating a default authentication method and an enabled authentication method, and the authentication controller displays the authentication screen based on the default authentication method, and upon accepting an operation of selecting the enabled authentication method, the authentication controller changes the displayed authentication screen to the authentication screen based on the selected enabled authentication method.

13. An authentication method performed by a shared terminal, the authentication method comprising:

acquiring authentication screen data, upon detecting that the shared terminal is activated, from an information processing apparatus coupled to the shared terminal via a communication network, for authentication performed for using an internal function of the shared terminal, and displaying an authentication screen based on the acquired authentication screen data;

transmitting, to the information processing apparatus, input information that is input to the displayed authentication screen by a user;

displaying a screen for using the internal function of the shared terminal, upon acquiring a signal indicating that an authentication process, which is performed based on the input information at the information processing apparatus, is successful, acquiring information indicating an authentication method that is set from the information processing apparatus, and displays the authentication screen based on the authentication method indicated in the acquired information, said information indicating the authentication method including information indicating a default authentication method and an enabled authentication method, and displaying the authentication screen based on the default authentication method, and upon accepting an operation of selecting the enabled authentication method, changing the displayed authentication screen to the authentication screen based on the selected enabled authentication method.

* * * * *